(12) United States Patent
Jin et al.

(10) Patent No.: US 9,176,858 B2
(45) Date of Patent: Nov. 3, 2015

(54) STORAGE SYSTEM CONFIGURED TO SELECTIVELY UTILIZE DATA COMPRESSION BASED ON REAL POOL USAGE RATES

(71) Applicant: Hitachi, Ltd., Tokyo (JP)

(72) Inventors: Azusa Jin, Sagamihara (JP); Tomohiro Kawaguchi, Fujisawa (JP); Masahiro Arai, Machida (JP); Hiroaki Akutsu, Yokohama (JP)

(73) Assignee: HITACHI, LTD. (JP)

( * ) Notice: Subject to any disclaimer, the term of this patent is extended or adjusted under 35 U.S.C. 154(b) by 197 days.

(21) Appl. No.: 13/701,140

(22) PCT Filed: Nov. 19, 2012

(86) PCT No.: PCT/JP2012/007397
§ 371 (c)(1),
(2) Date: Nov. 30, 2012

(87) PCT Pub. No.: WO2014/076743
PCT Pub. Date: May 22, 2014

(65) Prior Publication Data
US 2014/0143517 A1    May 22, 2014

(51) Int. Cl.
G06F 12/02    (2006.01)
G06F 3/06    (2006.01)

(52) U.S. Cl.
CPC .............. *G06F 12/023* (2013.01); *G06F 3/067* (2013.01); *G06F 3/0608* (2013.01); *G06F 3/0644* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 5,710,909 A * | 1/1998 | Brown et al. | 711/170 |
| 6,877,081 B2 * | 4/2005 | Herger et al. | 711/170 |
| 2002/0097172 A1 * | 7/2002 | Fallon | 341/51 |
| 2003/0166399 A1 * | 9/2003 | Tokkonen et al. | 455/419 |
| 2004/0030847 A1 * | 2/2004 | Tremaine | 711/154 |
| 2004/0199740 A1 * | 10/2004 | Makela et al. | 711/170 |
| 2004/0225854 A1 * | 11/2004 | Friauf et al. | 711/170 |
| 2008/0301164 A1 * | 12/2008 | Isobe | 707/101 |
| 2009/0070356 A1 * | 3/2009 | Mimatsu | 707/101 |
| 2009/0144496 A1 | 6/2009 | Kawaguchi | |
| 2011/0060885 A1 * | 3/2011 | Satoyama et al. | 711/170 |
| 2011/0066823 A1 * | 3/2011 | Ando et al. | 711/171 |
| 2011/0283078 A1 * | 11/2011 | Tamura et al. | 711/170 |
| 2012/0131303 A1 * | 5/2012 | Goebel et al. | 711/171 |
| 2013/0007360 A1 * | 1/2013 | Shiga | 711/112 |

* cited by examiner

*Primary Examiner* — Yaima Rigol
*Assistant Examiner* — Tasnima Matin
(74) *Attorney, Agent, or Firm* — Volpe and Koenig, P.C.

(57) ABSTRACT

The present invention relates to executing data compression based on the used capacities of real pools. The present storage subsystem stores a definition information regarding conditions of starting data compression and ending data compression defined via usage rates of a real pool as physical area, wherein if the usage rate of the real pool satisfies the condition for starting compression, the compression processing is started, and if the usage rate satisfies the condition for ending compression, the compression processing is ended.

15 Claims, 23 Drawing Sheets

Fig. 7

Real Pool Capacity Depletion Threshold
Management Table

| Real Pool Number | Capacity Depletion Threshold |
|---|---|
| 01 | 80% |
| 02 | 70% |
| 03 | 90% |
| ... | ... |

Fig. 8

Compression Start/End Threshold
Management Table

| Real Pool Number | Compression Start Threshold | Compression End Threshold |
|---|---|---|
| 01 | 70% | 60% |
| 02 | 60% | 50% |
| 03 | 80% | 70% |
| ... | ... | ... |

Real Pool Management Table

| Real Pool Number | Chunk ID | Page ID | Physical Address | Page Status | Capacity (MB) |
|---|---|---|---|---|---|
| 01 | 0001 | 00001 | 00001~00100 | Allocated | 100 |
|  |  | 00002 | 00101~00200 | Reserved | 100 |
|  |  | 00003 | 00201~00300 | Unallocated | 100 |
|  |  | ... | ... | ... | ... |
|  | 0002 | 00101 | 01001~01010 | Allocated | 10 |
|  |  | 00102 | 01011~01020 | Unallocated | 10 |
|  |  | ... | ... | ... | ... |
|  | 0003 | 00201 | 02001~02010 | Unallocated | 10 |
|  |  | ... | ... | ... | ... |
| ... | ... | ... | ... | ... | ... |

Fig.11

Inter-Real Pool Area Management Table

| Real Pool Number | Chunk ID | Attribute |
|---|---|---|
| 01 | 0001 | Uncompressed Page Storage Area |
|  | 0002 | Compressed Page Storage Area |
|  | 0003 | Compressed Page Storage Area |
|  | . . . | . . . |
| 02 | 0001 | Uncompressed Page Storage Area |
|  | 0002 | Uncompressed Page Storage Area |
|  | 0003 | Undefined |
|  | . . . | . . . |
| . . . | . . . | . . . |

Fig.12

Real Pool Capacity Management Table

| Real Pool Number | Compression Permission | Unused Capacity | Used Capacity | Compressed Capacity | Uncompressed Capacity |
|---|---|---|---|---|---|
| 01 | Permitted | 25TB | 75TB | 35TB | 40TB |
| 02 | Permitted | 35TB | 65TB | 0TB | 65TB |
| 03 | Prohibited | 15TB | 85TB | 60TB | 25TB |
| . . . | . . . | . . . | . . . | . . . | . . . |

Fig. 13

Virtual Volume Management Table

| Real Pool Number | Virtual VOL Number | Virtual Area ID | Page ID | Capacity (MB) | Compression Flag |
|---|---|---|---|---|---|
| 01 | 001 | 1 | 00001 | 100 | 0 |
| | | 2 | 00002 | 100 | 0 |
| | | 3 | 00003 | 100 | 0 |
| | | ... | ... | ... | ... |
| | 002 | 1 | 00101, 00102, 00103 | 30 | 1 |
| | | 2 | 00104, 00105 | 20 | 1 |
| | | 3 | 00004 | 100 | 0 |
| | | 4 | 00005 | 100 | 0 |
| ... | ... | ... | ... | ... | ... |

Fig. 14

Virtual Volume Average Compression Rate Management Table

| Virtual VOL Number | Average Compression Rate |
|---|---|
| 001 | - |
| 002 | 25% |
| 003 | 50% |
| 004 | - |
| . . . | . . . |

Fig. 15

Compression Target Volume Management Table

| Compression Target Priority | Virtual VOL Number | Compression Permission Status |
|---|---|---|
| 1 | 002 | Permitted |
| 2 | 006 | Permitted |
| 3 | 005 | Not Assigned |
| 4 | 003 | Prohibited |
| . . . | . . . | |

Fig. 21

Decompression Start/End Threshold
Management Table

| Real Pool Number | Decompression Start Threshold | Decompression End Threshold |
|---|---|---|
| 01 | 30% | 40% |
| 02 | 10% | 20% |
| 03 | 20% | 30% |
| . . . | . . . | . . . |

Fig. 24

Compression Start/End Threshold
Multiple Management Table

| Real Pool Number | Compression Start Threshold 1 | Threshold 1 CPU Usage Rate | Compression Start Threshold 2 | Threshold 2 CPU Usage Rate | ... | Compression End Threshold 1 | ... |
|---|---|---|---|---|---|---|---|
| 01 | 50% | 20% | 60% | 40% | ... | 30% | ... |
| ... | ... | ... | ... | ... | ... | ... | ... |

Fig. 25

Real Pool Management Table

| Real Pool Number | Page ID | Physical Address | Page Status | Capacity (MB) |
|---|---|---|---|---|
| 01 | 00001 | 00001~00100 | Compressed | 10 |
|  | 00002 | 00101~00200 | Compressed | 10 |
|  | 00003 | 00201~00300 | Compressed | 10 |
|  | ... | ... | ... | ... |
|  | 00101 | 01001~01010 | Uncompressed | 10 |
|  | 00102 | 01011~01020 | Reserved | 10 |
|  | ... | ... | ... | ... |
|  | 00201 | 02001~02010 | Unallocated | 10 |
|  | ... | ... | ... | ... |
| ... | ... | ... | ... | ... |

Virtual Pool Management Table

| Virtual Pool Number | Virtual VOL Number | Virtual Area ID | Storage ID | Real Pool Number | Page ID | Capacity (MB) | Compression Flag |
|---|---|---|---|---|---|---|---|
| 01 | 001 | 1 | aaa | 01 | 00001 | 100 | 0 |
| | | 2 | | | 00002 | 100 | 0 |
| | | 3 | | | 00003 | 100 | 0 |
| | | ... | ... | ... | ... | ... | ... |
| | 002 | 1 | bbb | 02 | 00101, 00102, 00103 | 30 | 1 |
| | | 2 | | | 00104, 00105 | 20 | 1 |
| | | 3 | | | 00004 | 100 | 0 |
| | | 4 | | | 00005 | 100 | 0 |
| ... | ... | ... | ... | ... | ... | ... | ... |

Fig. 30

Virtual Pool Compression Start/End
Threshold Management Table

| Virtual Pool Number (3011) | Storage ID (3012) | Real Pool Number (3013) | Compression Start Threshold (3014) | Compression End Threshold (3015) |
|---|---|---|---|---|
| 01 | aaa | 01 | 70% | 60% |
|  |  | 02 | 60% | 50% |
|  | bbb | 03 | 80% | 70% |
| ... | ... | ... | ... | ... |

STORAGE SYSTEM CONFIGURED TO SELECTIVELY UTILIZE DATA COMPRESSION BASED ON REAL POOL USAGE RATES

TECHNICAL FIELD

The present invention relates to a storage system.

BACKGROUND ART

A technique called thin provisioning has been developed with the aim to facilitate management of storage subsystems and to enhance the efficiency of capacity thereof. This technique is for providing a virtual logical volume that does not have a physical storage area (hereinafter abbreviated as virtual volume) from the storage subsystem to a host computer, and dynamically allocating pages from a real pool which is a physical storage area in response to writing of data from the host computer to the virtual volume. A page refers to a single unit when the storage area is divided into multiple areas. This technique enables to enhance the capacity efficiency of a storage subsystem and to facilitate capacity design.

Another technique for realizing enhanced capacity efficiency is a compression technique that reduces the amount of data by compressing the data stored in the storage subsystem. For example, patent literature 1 teaches a method for compressing the data within a virtual volume using thin provisioning technique.

CITATION LIST

Patent Literature

PTL 1: US Patent Application Publication No. 2009/0144496

SUMMARY OF INVENTION

Technical Problem

On the other hand, the use of such compression function may cause deterioration of response performance for responding to high level devices due to the load applied on the CPU or the like. In order to solve this problem, patent literature 1 teaches compressing data asynchronously as the write command received from the high level device, and storing the data.

However, even if data is compressed asynchronously as the write command from the high level tier, decompression processing must be performed when the high level device accesses the compressed data, so that the response to the high level device may be delayed.

Therefore, it becomes necessary to store the data efficiently via compression while minimizing the deterioration of response performance to the high level device caused by compression.

Solution to Problem

In order to solve this problem, according to the storage subsystem of the present invention, when the real pool usage rate, which is the ratio of the real storage area being allocated to a virtual volume out of the multiple pages constituting a real pool, exceeds a compression start threshold, compression processing of the virtual volume is executed in the order of compression target priority set respectively to virtual volumes, and when the real pool usage rate falls below a data compression end threshold set in advance, the execution of compression processing is stopped.

Advantageous Effects of Invention

According to the present invention, it becomes possible to suppress the deterioration of priority accompanying compression processing, and to store data in an efficient manner.

BRIEF DESCRIPTION OF DRAWINGS

FIG. 7 is an explanatory view showing a configuration of a real pool capacity depletion threshold management table 221 according to the present invention.

FIG. 8 is an explanatory view showing the configuration of a compression start/end threshold management table 222 according to the present invention.

FIG. 11 is an explanatory view showing the configuration of an inter-real pool area management table 224 according to the present invention.

FIG. 12 is an explanatory view showing the configuration of a real pool capacity management table 225 according to the present invention.

FIG. 13 is an explanatory view showing the configuration of a virtual volume management table 226 according to the present invention.

FIG. 14 is an explanatory view showing the configuration of a virtual volume average compression rate management table 227 according to the present invention.

FIG. 15 is an explanatory view showing a configuration of a compression target volume management table 228 according to the present invention.

FIG. 21 is an explanatory view showing the configuration of a decompression start/end threshold management table 1912 according to embodiment 2 of the present invention.

FIG. 24 is an explanatory view showing a configuration of a multiple compression start/end threshold management table 2400 according to embodiment 3 of the present invention.

FIG. 25 is an explanatory view showing a configuration of a real pool management table 2520 according to embodiment 4 of the present invention.

FIG. 30 is an explanatory view showing a configuration of a compression start/end threshold management table 2812 according to embodiment 5 of the present invention.

DESCRIPTION OF EMBODIMENTS

Now, the preferred embodiments of the present invention will be described with reference to the drawings. In the following description, the equivalent portions are denoted with the same reference numbers. However, the present invention is not restricted to the present embodiments, and various modifications in conformity with the concept of the present invention will be included in the technical range of the invention. Further, the number of each component can be one or more than one unless defined otherwise.

In the following description, various information are referred to as "table" and the like, but the various information can be expressed by data structures other than tables. Further, the "table" can also be referred to as "management information" to indicate that the information does not depend on the data structure.

The processes are sometimes described using the term "program" as the subject. The program is executed by a processor such as a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or a storage media, for example.

Each element (such as a real pool) can be identified via ID or numbers, but other types of identification information such as names can be used as long as they are identifiable information.

Embodiment 1

Now, a first embodiment of the present invention will be described with reference to FIGS. 1 through 18. In the first embodiment, a basic embodiment of the present invention will be described.

Figure 1:
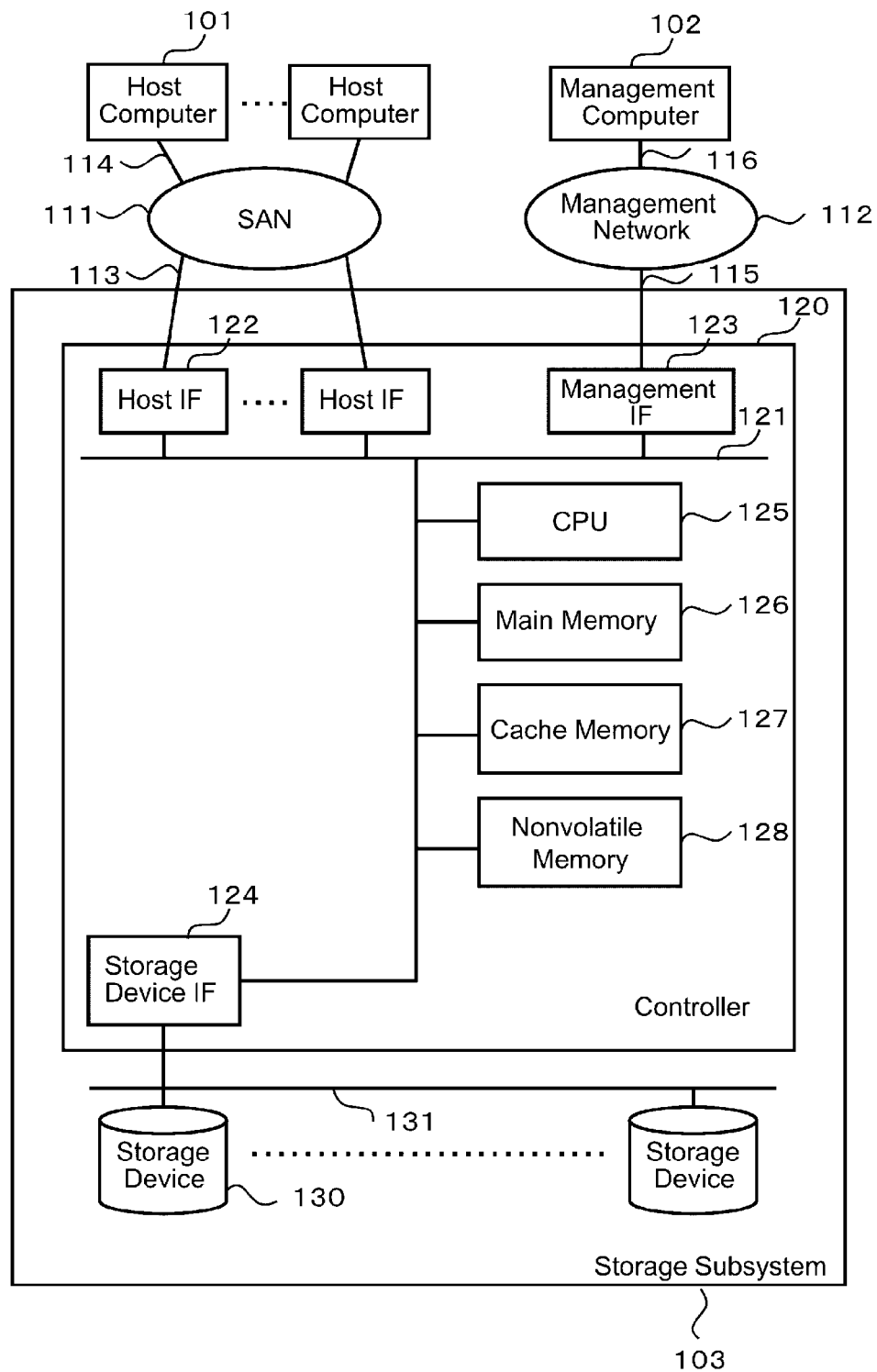
FIG. 1 is an explanatory view illustrating the configuration of a storage system according to the present invention.

FIG. 1 is an explanatory view showing the configuration of a storage system according to the present invention.

The present storage system includes, for example, one or more host computers 101, one or more management computers 102, and one or more storage subsystems 103.

The host computer 101 and the storage subsystem 103 are coupled for example via a SAN (Storage Area Network) 111. The storage subsystem 103 is coupled to the SAN 111 via a communication line 113. The host computer 101 is coupled to the SAN 111 via a communication line 114.

The management computer 102 and the storage subsystem 103 are coupled for example via a management network 112. The storage subsystem 103 is coupled via a communication line 115 to the management network 112. The management computer 102 is coupled via a communication line 116 to the management network 112.

The above-described communication lines 113, 114, 115 and 116 are composed as wired lines formed of metal cables or optical fiber cables. Further, the SAN 111 and the management network 112 can be a common network. The SAN 111 and the management network 112 are a communication network, such as a SAN (Storage Area Network) or a LAN (Local Area Network).

The storage subsystem 103 includes one or more controllers 120, and one or more storage devices 130. The controller 120 and the storage device 130 are coupled via a communication line 131. The communication line 131 can be formed as a wired line such as a SAS (Serial Attached SCSI) cable, a SATA (Serial Advanced Technology Attachment) cable or a FC (Fibre Channel) cable. These couplings can also be realized wirelessly instead of via wired lines.

In the present embodiment, the multiple storage devices 130 include at least an SSD (Solid State Drive) and an HDD (Hard Disk Drive), and can further include other types of physical storage devices such as optical disks or magnetic tapes.

The controller 120 controls reading of data to or writing of data from the storage device 130 based on the command received from the host computer 101.

The controller 120 can unite one or more storage devices 130, and logically divide the storage devices into multiple data storage areas (hereinafter referred to as logical volumes) and utilize the same. If multiple storage devices 130 are provided, by applying a RAID (Redundant Array of Independent Disks) configuration, the storage devices can be arranged as storage devices having redundancy of an appropriate RAID level (for example, RAID5).

For example, the controller 120 manages one or more logical volumes as real pools. Further, the controller 120 divides the logical volume into one or more storage area management units (hereinafter referred to as pages) and manages the same. In this case, the real pool is composed of one or more pages. The capacities and numbers of real pools and pages are not especially restricted in the present specification, as long as they fall within the range of capacity of the physical storage area provided by the storage device 130.

Figure 4:
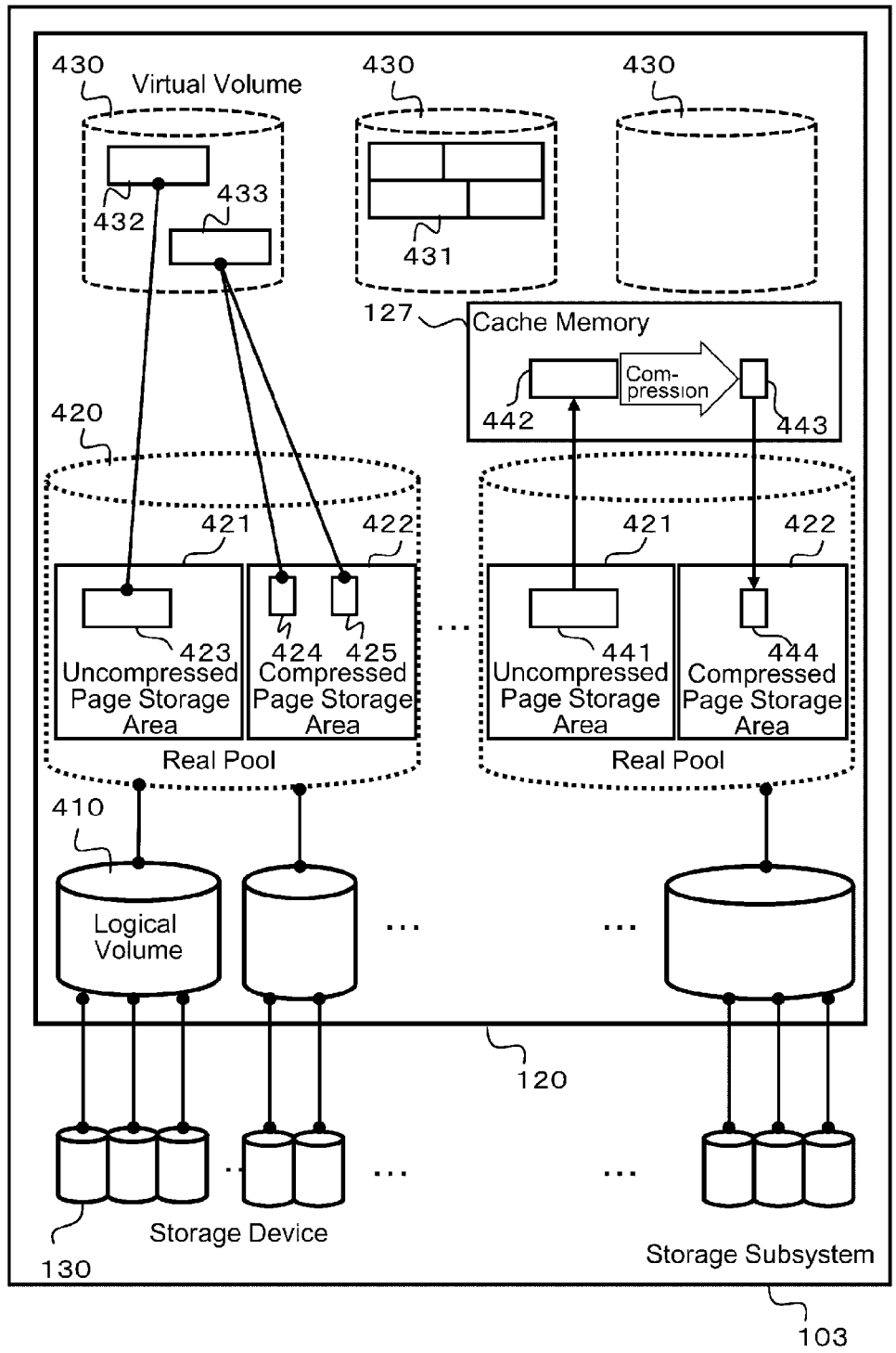
FIG. 4 is an explanatory view showing the relationship between virtual volumes, pages, real pools and storage devices, and the operation performed when compressing pages according to the present invention.

The controller 120 provides a virtual volume accompanying thin provisioning to the host computer 101. The virtual volume is composed of multiple virtual areas. The virtual volume, the details of which are described with reference to FIG. 4, is a virtual storage area, which is represented for example via a LBA (Logical Block Address). Though the details are described in FIG. 4, the pages are mapped to the virtual areas. At this time, multiple pages may be allocated to a single virtual area.

The controller 120 includes, for example, a storage resource, a communication interface unit (hereinafter, an interface unit is abbreviated as "IF"), and a CPU (Central Processing Unit) 125 coupled thereto.

The storage resource includes, for example, a main memory 126, a cache memory 127, and a nonvolatile memory 128.

Various programs 211 through 215 stored in the nonvolatile memory 128 are read into the main memory 126 when necessary. Various processes described later are performed by the CPU 125 by executing the various programs 211 through 215 read into the main memory 126.

The cache memory 127 temporarily stores the data received from the host computer 101 and the data read out from the storage device 130.

The communication IF includes, for example, a host IF 122, a management IF 123, and a storage device IF 124. The respective storage resources 126, 127, 128, the CPU 125, and the respective communication IFs 122, 123 and 124 are mutually coupled via buses and other communication lines 121.

The host IF 122 is coupled via the communication line 113, the network 111 and the communication line 114 to the host computer 101. An access command (write command or read command) is received via the host IF 122.

The management IF 123 is coupled via the communication line 115, the network 112 and the communication line 116 to the management computer 102. The management IF 123 is, for example, an NIC (Network Interface Card).

The storage device IF 124 executes data transmission and reception with the respective storage devices 130. The storage device IF 124 is coupled to the respective storage devices 130 via a communication path 131.

Figure 2:
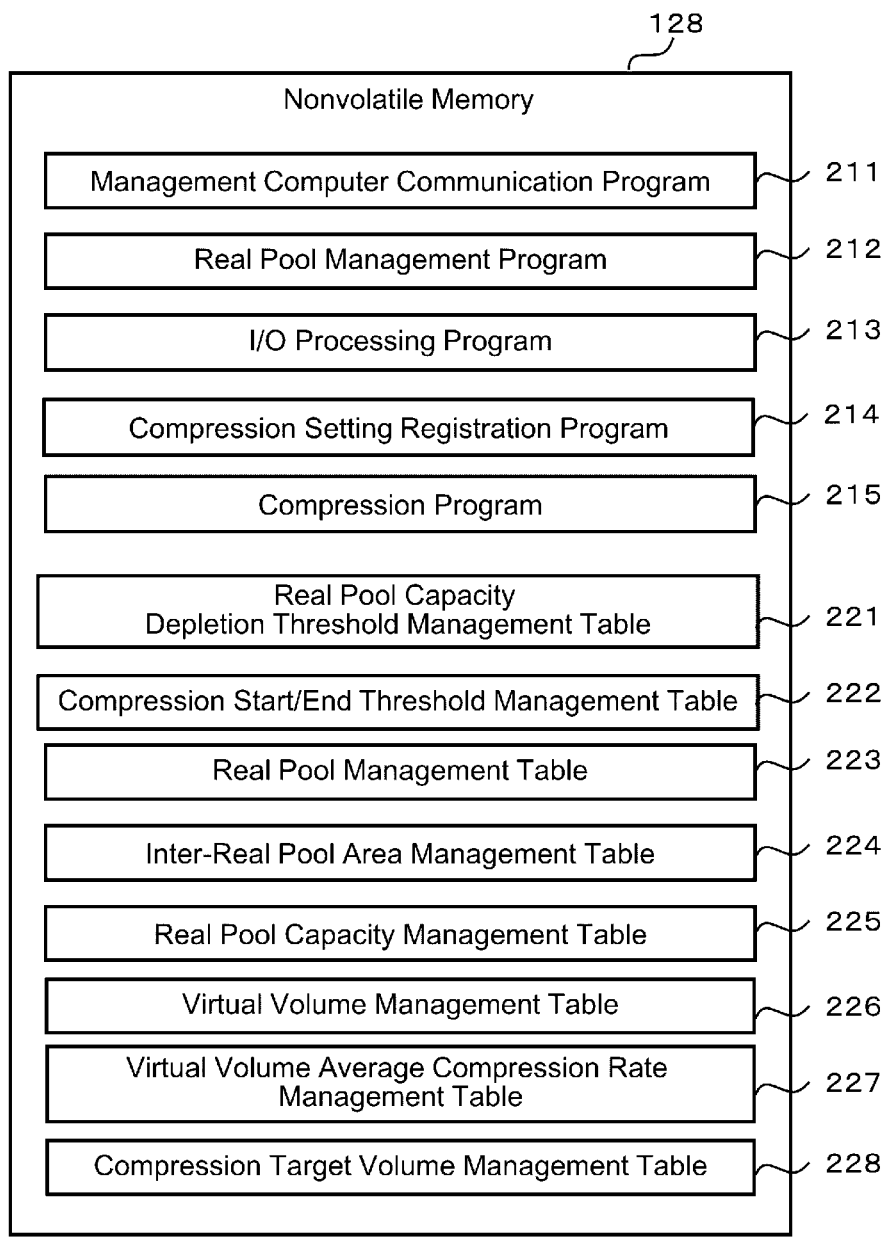
FIG. 2 is an explanatory view showing a configuration of a program and a table stored in a nonvolatile memory 128 according to the present invention.

FIG. 2 is an explanatory view illustrating the configuration of programs and tables within a nonvolatile memory 128 of the present invention.

The nonvolatile memory 128 stores computer programs and information.

The respective programs 211 through 215 and tables 221 through 228 are transferred from the nonvolatile memory 128 to the main memory 126 and executed via the CPU 125.

A management computer communication program 211 is a program executed when the CPU 125 performs communication with the storage subsystem 103 and the management computer 102 (actually, a storage communication program 312 mentioned later).

The real pool management program 212 is a program executed when the CPU 125 performs processes related to real pool management, such as the virtualization of multiple storage devices 130 or the update of respective tables 221 through 228.

An I/O processing program 213 is a program executed when the CPU 125 performs processes related to I/Os such as the reading and writing of data from the host computer 101.

A compression setting registration program 214 is a program for receiving a compression setting request from the management computer 102 and handing the content to be recorded to the real pool management program. The details of the processing according to this program will be described with reference to FIG. 16.

A compression program 215 is a program executed when the CPU 125 compresses the entered data elements. The details of the processing performed by this program will be described with reference to FIGS. 17 and 18.

A real pool capacity depletion threshold management table 221 is a table for storing a capacity depletion threshold of each real pool. The details of this table will be described later with reference to FIG. 7.

A compression start/end threshold management table 222 is a table for storing a compression start threshold and a compression end threshold of each real pool. The details of this table will be described later with reference to FIG. 8.

A real pool management table 223 is a table for storing a chunk ID, a page ID, a physical address, a page status and a capacity of each real pool. The details of this table will be described later with reference to FIG. 10.

An inter-real pool area management table 224 is a table for storing the chunk ID and the attribute of that chunk (according to the present embodiment, whether the chunk is an uncompressed page storage area or a compression page storage area) of each real pool. The details of this table will be described later with reference to FIG. 11.

A real pool capacity management table 225 is a table for storing an unused capacity, a used capacity, a compressed capacity and an uncompressed capacity of each real pool. The details of this table will be described later with reference to FIG. 12.

A virtual volume management table 226 is a table for storing a virtual area ID, a page ID, a capacity, and a compression flag for each virtual volume. The details of this table will be described later with reference to FIG. 13.

A virtual volume average compression rate management table 227 is a table for storing an average compression rate for each virtual volume. The details of this table will be described later with reference to FIG. 14.

A compression target volume management table 228 is a table for storing a virtual volume number for each compression target priority. The details of this table will be described later with reference to FIG. 15.

Figure 3:
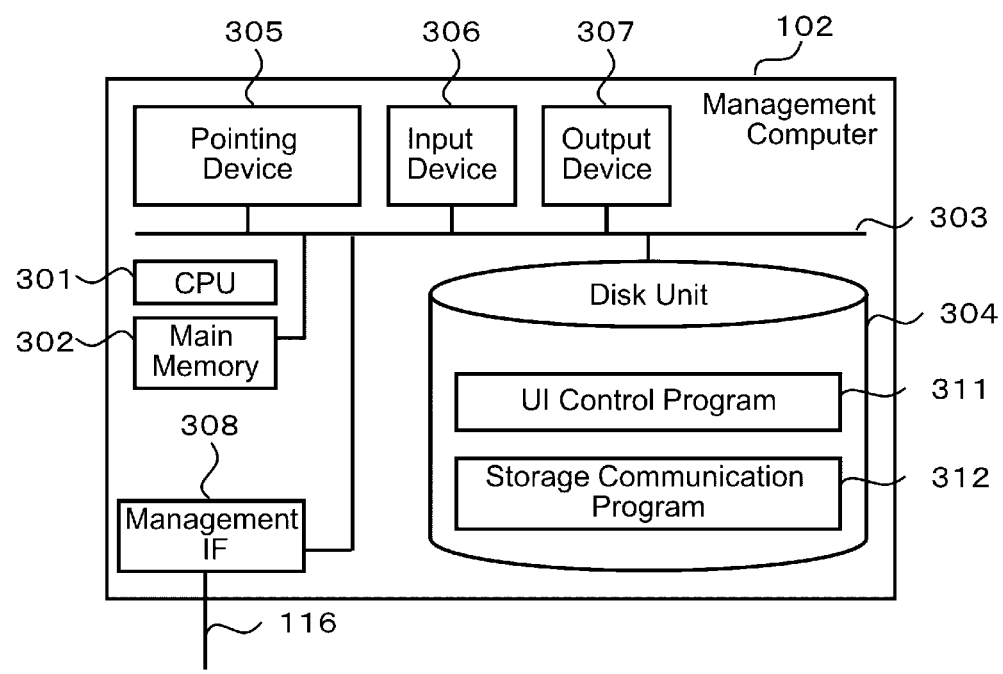
FIG. 3 is an explanatory view showing a configuration of a management computer 102 according to the present invention.

FIG. 3 is an explanatory view illustrating a configuration of the management computer 102 according to the present invention.

The management computer 102 includes a CPU 301, a main memory 302, a disk unit 304, a pointing device 305, an input device 306, an output device 307 and a management IF 308, which are mutually coupled via a bus 303.

The disk unit 304 records a UI (User Interface) control program 311 and a storage communication program 312.

The main memory 302 is transferred when the UI control program 311 and the storage communication program 312 stored in the disk unit 304 are executed.

The CPU 301 executes a UI control processing and a storage communication processing by executing the programs stored in the main memory 302.

The UI control program 311 executed by the CPU 301 displays a compression setting screen 500, an alert screen A 610, an alert screen B 620 and the like on the output device 307 in response to requests from the storage subsystem 103. Further, the UI control program 311 stores the information entered from an administrator through the pointing device 305 or the input device 306 to the main memory 302 by being executed via the CPU 301.

The storage communication program 312 executed by the CPU 301 communicates with the storage subsystem 103 via the management network 116. For example, the information entered by the administrator through execution of the UI control program 311 is transmitted when necessary to the storage subsystem 103.

The configuration of the host computer 101 is similar to the configuration of a prior art host computer.

FIG. 4 is an explanatory view showing in frame format the relationship between the virtual volumes, pages, real pools and storage devices, and the operation performed when compressing pages according to the present invention.

One or more storage devices 130 constitute a logical volume 410 which is a logically divided storage area.

The real pool 420 is composed of one or more logical volume groups. The real pool includes one or more pages, which are storage area management units. The real pool 420 is managed by being divided into one or more storage areas (chunks). In the example of FIG. 4, the real pool is divided into a uncompressed page storage area 421 and a compressed page storage area 422.

The virtual volume 430 is a logical storage area recognized by the host computer 101, which is composed of one or more virtual areas 431. The one or more virtual areas 431 constituting the virtual volume 430 can be provided from one real pool or multiple different real pools.

In the example of FIG. 4, a virtual storage area 432 of the virtual volume 430 is composed of a page 423 of the uncompressed page storage area 421 in the real pool 420, and a virtual storage area 433 is composed of pages 424 and 425 of the compressed page storage area 422 in the real pool 420. The relationships thereof are managed in the virtual volume management table 226 (FIG. 13) by coupling the virtual area ID 1312 and the page ID 1313.

The above description has illustrated the relationship between the virtual volumes, pages, real pools and storage devices according to the present invention. The operation for compressing pages within a real pool according to the present invention will be described later with reference to S1815, S816 and S1820 of FIG. 18.

Figure 5:
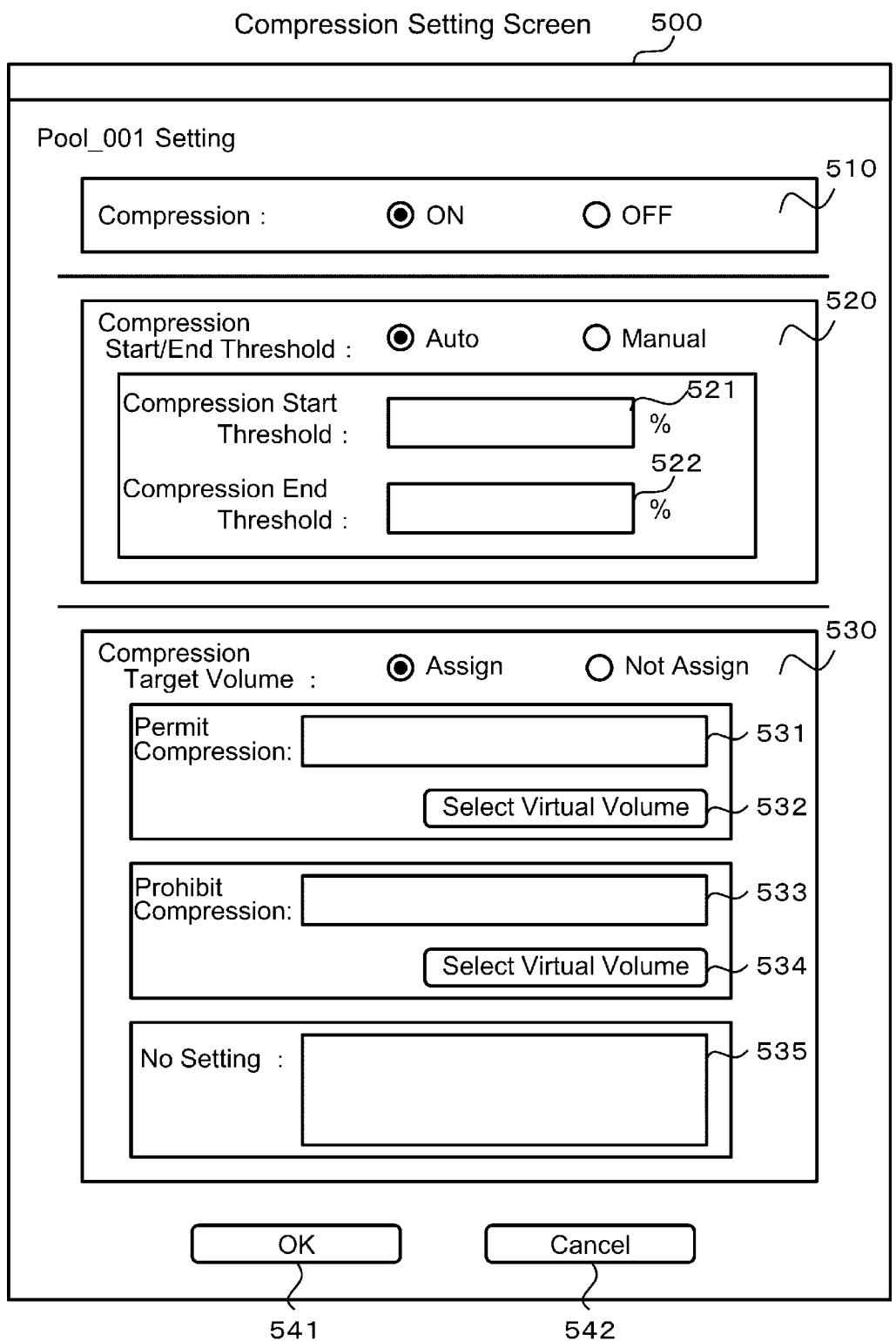
FIG. 5 is an explanatory view illustrating a compression setting screen 500 according to the present invention.

FIG. 5 shows a compression setting screen 500 displayed on the management computer 102. The compression setting screen 500 is displayed via the UI control program 311 on the output device 307 of the management computer 102.

A compression selection radio button 510 is a radio button for determining whether to allow compression of the real pool or not.

A compression start/end threshold radio button 520 is a radio button for determining whether the threshold for starting compression is determined automatically or not when the compression selection radio button 510 is turned ON.

A compression start threshold entry box 521 is an entry box for entering the compression start threshold when "Manual" is selected via the compression start/end threshold radio button 520.

A compression end threshold entry box 522 is an entry box for entering the compression end threshold when "Manual" is selected via the compression start/end threshold radio button 520.

A compression target volume radio button 530 is a radio button for determining whether or not to automatically determine the virtual volume being the target of compression when the compression selection radio button 510 is turned ON.

A compression permission virtual volume list 531 is an area for displaying virtual volumes selected as compression permission target when "assign" is selected via the compression target volume radio button 530.

A compression permission candidate display button 532 is a button for starting a sub-screen for presenting candidates of virtual volumes having compression permission to the user. The virtual volume selected via the sub-screen is displayed on the compression permission virtual volume list 531.

A compression prohibition virtual volume list 533 is an area for displaying the virtual volumes selected as the compression prohibition target when "assign" is selected via the compression target volume radio button 530.

A compression prohibition candidate display button 534 is a button for starting a sub-screen for presenting candidates of virtual volumes where compression is prohibited to the user. The virtual volumes selected via the sub-screen are displayed on the compression prohibition virtual volume list 533.

A no-setting virtual volume list 535 is an area for displaying a virtual volume not selected as the compression permission target or the compression prohibition target when "assign" is selected via the compression target volume radio button 530. As for the virtual volumes displayed here, the compression permission status is managed as "not assign" in the compression target volume management table 228 of FIG. 15.

A set content OK button 541 is for sending the entered contents of 510 through 534 via the storage communication program 312 to the controller 120. A set content cancel button 542 is a button for cancelling the entered contents of 510 through 534 and terminating the process. The above described example describes only one display example, and the screen can be composed of multiple screens, or the order of entry can be other than that described above.

Figure 6:
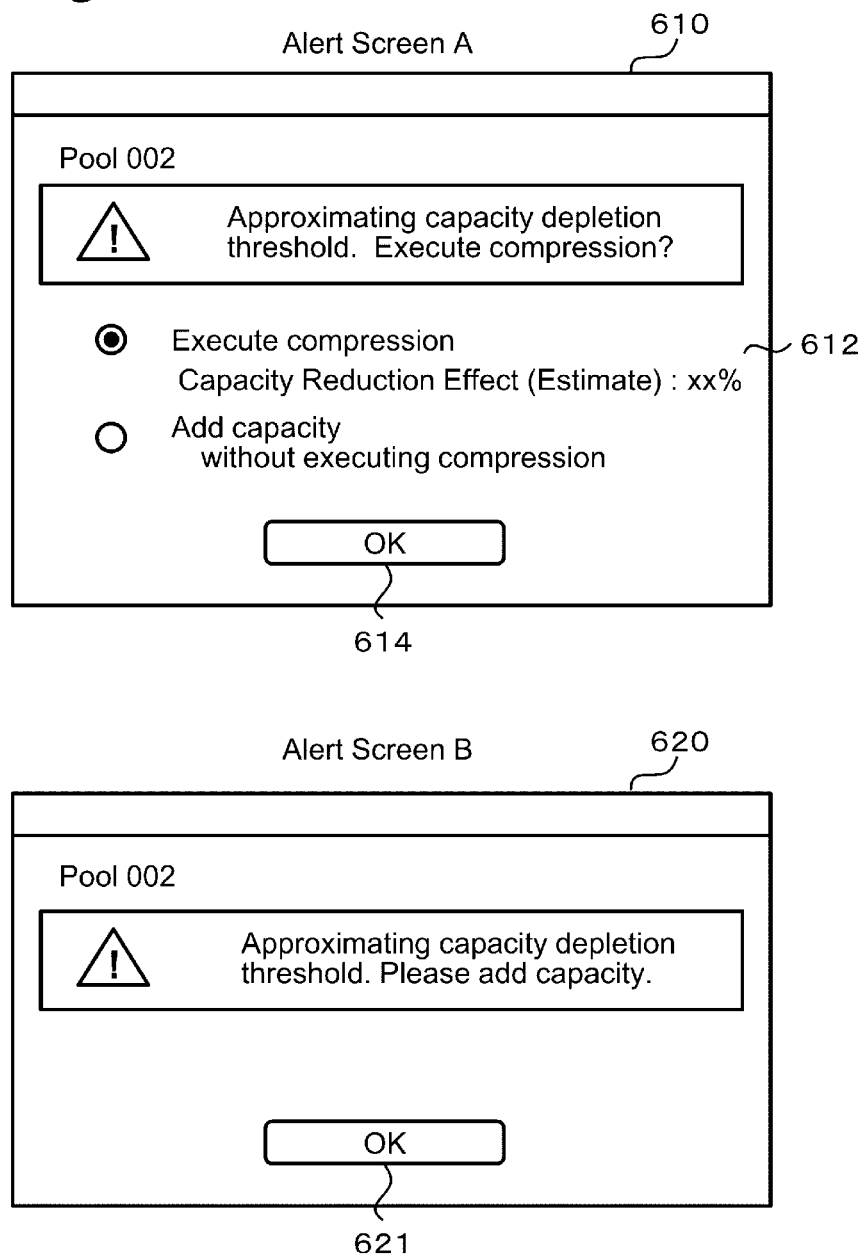
FIG. 6 is an explanatory view illustrating alert screens 610 and 620 according to the present invention.

FIG. 6 shows the alert screen A 610 and the alert screen B 620 displayed on the management computer 102.

The alert screen A 610 is displayed via the UI control program 311 on the output device 307 of the management computer 102. The alert screen A 610 is a screen displayed when step S1714 of FIG. 17 described later is Yes, and the screen includes a compression execution radio button 612 and an OK button 614.

The compression execution radio button 612 is a radio button allowing the administrator to enter whether to execute compression or not. Here, it is possible to display an estimate value of the effect of capacity reduction. The estimate value can be calculated for example via a method described later with reference to S1714 of FIG. 17 where a predictive value is computed via past compression rates, or a predictive value can be calculated by newly compressing a portion of the pages and sampling the compression rates thereof.

The OK button 614 is a button for determining entry of the compression execution radio button 612 and for ending the alert screen A 610.

The alert screen B 620 is displayed via the UI control program 311 on the output device 307 of the management computer 102. The alert screen B 620 is a screen displayed when No is selected in S1714 described later, and includes an OK button 621. The OK button 621 is a button for ending the alert screen B 620.

Hereafter, the respective tables stored in the nonvolatile memory 128 of the storage subsystem 103 will be described with reference to FIGS. 7 through 15.

FIGS. 7, 8, and 10 through 15 are explanatory views illustrating table configurations. FIG. 9 is an explanatory view showing the relationship between starting and ending of compression of data within a real pool in response to the capacity threshold according to the present invention.

FIG. 7 illustrates the real pool capacity depletion threshold management table 221.

Now, the real pool capacity depletion threshold is a threshold set with respect to the ratio of use of the real pool. The real pool use ratio (%) is a value calculated using the "unused capacity" column 1213 and the "used capacity" column 1214 of the real pool management table 225 described later with reference to FIG. 12, for example, as (used capacity)/((unused capacity)+(used capacity))×100(%).

A "real pool number" column 811 stores identification numbers of real pools defined in the storage subsystem 103.

A "capacity depletion threshold" column 812 stores the capacity depletion threshold of the real pool. The capacity depletion threshold is a threshold for determining that suppression of real pool use is necessary so as to prevent the free capacity of the real pool from becoming 0. For example, although not shown in the drawing, a screen for prompting input is displayed on the output device 307 of the management computer 102, and the capacity depletion threshold is designated through the input device 306. Further, it is also possible to determine the capacity depletion threshold to a fixed value in advance without asking the user to enter a value. If the ratio of use of the real pool exceeds the capacity depletion threshold, for example, the storage subsystem 103 notifies a capacity addition request to the administrator.

For example, line 813 shows that the capacity depletion threshold of real pool number "01" is "80%". In other words, the storage subsystem 103 notifies a capacity addition request to the administrator when the used capacity of real pool number 01 exceeds 80% of the capacity of the whole real pool.

FIG. 8 illustrates a compression start/end threshold management table 222.

Now, the compression start threshold and the compression end threshold are thresholds set regarding the ratio of use of the real pool. The "compression start threshold" column 912 stores the usage rate of the real pool that triggers the starting of compression. The "compression end threshold" column 913 stores the usage rate of the real pool that triggers the termination of compression.

For example, line 914 indicates that the compression start threshold of real pool number "01" is "70%", and the compression end threshold thereof is "60%. In other words, the storage subsystem 103 starts compression when the used capacity of the real pool number 01 exceeds 70% of the capacity of the whole real pool, and ends compression when the used capacity falls below 60%.

Next, with reference to FIG. 9, the relationship between the capacity depletion threshold, the compression start threshold and the compression end threshold of real pool 420, and the relationship of the used capacities before and after compression, will be described.

The capacity depletion threshold 711 sends a request to the administrator to add capacity for example when this value is exceeded.

Next, the compression start threshold 712 is a value smaller than the capacity depletion threshold 711, and the compression end threshold 713 is a value smaller than the compression start threshold 712. As described in S1712 mentioned later, if the real pool usage rate exceeds the compression start threshold 712 (in the state of used capacity 714 before compression), the compression processing is started, and in step S1821 described later, if the real pool usage rate falls below the compression end threshold 713 (in the state of used capacity 715 after compression), the compression is ended.

Figures 9, 10:
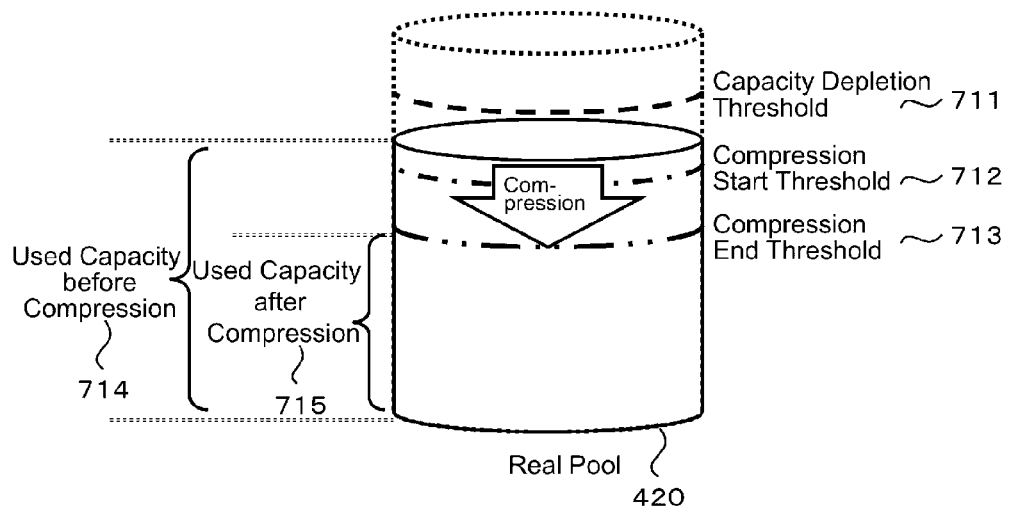
FIG. 9 is an explanatory view showing the relationship between start and end of compression of data within a real pool corresponding to a capacity threshold according to the present invention.
FIG. 10 is an explanatory view showing a configuration of a real pool management table 223 according to the present invention.

FIG. 10 illustrates a real pool management table 223.

A "real pool number" column 1011 stores the identification number of the real pool defined in the storage subsystem 103.

A "chunk ID" column 1012 stores the identification number of a divided area (chunk) within the real pool such as the uncompressed page storage area 421 or the compressed page storage area 422 in FIG. 4.

A "page ID" column 1013 stores the identification number of a page within the real pool.

A "physical address" column 1014 stores the address information in the storage device of the page.

A "page status" column 1015 stores the status of page allocation with respect to the virtual volume. In the present embodiment, for example, "allocation" refers to a state where the page is allocated to a virtual volume, "unallocated" refers to a state where the page is not allocated to the virtual volume, and "reserved" refers to a state where a page to be allocated to a virtual volume is reserved. In other words, when the page in "reserved" state is allocated to a virtual volume, the page status is updated to "allocated".

A "capacity (MB)" column 1016 stores the capacity of pages.

For example, line 1017 indicates that the page ID "00001" within chunk ID "0001" of real pool number "01" has a physical address of "00001-00100", the page status thereof is "allocated", and the page capacity is "100 MB".

Now, in the present embodiment, the size of the page unit of the uncompressed page storage area 421 is set to 100 MB, and the size of the page unit of the compressed page storage area 422 is set to 10 MB. This is because the size of the compressed page must be smaller than the uncompressed page. In the present embodiment, a single page is allocated to a single virtual area prior to compression.

In that case, if compression is performed to each virtual area and the compressed data is restored in a page having a size that is the same as or larger than the size prior to compression, even though the data has been reduced in size by compression, the data will occupy a page having the same or greater size. If so, an allowance is generated within the page after compression, but the capacity of the used pages will be the same or even greater, and the effect of reduction of used capacity by compression cannot be achieved.

FIG. 11 illustrates an inter-real pool area management table 224.

A "real pool number" column 1111 stores the identification number of the real pool defined in the storage subsystem 103.

A "chunk ID" column 1112 stores identification numbers of divided areas within the real pool (such as the uncompressed page storage area 421 or the compressed page storage area 422 of FIG. 4).

An "attribute" column 1113 stores information for identifying the attribute of the chunk. In the present embodiment, for example, whether the relevant chunk is an uncompressed page storage area, a compressed page storage area, or an undefined vacant area is managed.

For example, line 1114 indicates that the attribute of chunk ID "0001" within real pool number "01" is an uncompressed page storage area. Further, for example, line 1115 indicates that the attribute of chunk ID "0003" within real pool number "02" is an undefined vacant area.

In the present embodiment, the chunk in which the attribute is in an undefined state is not divided into page units as shown in FIG. 10. The reason for this is that an undefined chunk is not yet determined whether it will be used as a compressed area or an uncompressed area. Furthermore, since the page sizes differ depending on the purpose, the chunk should be divided into page units after the purpose of the chunk has been determined. It is also possible to have the chunk divided into page units in advance, and changing the page sizes by assembling and dividing the pages.

FIG. 12 shows a real pool capacity management table 225.

A "real pool number" column 1211 stores the identification number of the real pool defined in the storage subsystem 103.

A "compression availability" column 1212 stores whether compression of the relevant real pool is set to be effective or not in the compression setting screen 500.

An "unused capacity" column 1213 stores a value of the unallocated capacity within the real pool. The unused capacity can be obtained, for example, by totalizing the page capacity of the pages having the page status within the real pool set to "unallocated" within the real pool management table 223.

A "used capacity" column 1214 stores the value of the used capacity within the real pool. The used capacity can be acquired by totalizing the capacity of pages having the page status of the real pool set to "allocated" or "reserved" in the real pool management table 223. Further, the used capacity can be acquired by subtracting the values in the "unused capacity" column 1213 from the capacity of the whole real pool.

A "compressed capacity" column 1215 stores the values of the capacity having been compressed out of the used capacities of the real pool. The compressed capacity can be obtained, for example, by totalizing the capacity of pages having the page status set to "allocated" or "reserved" in the chunk ID (confirmed from the inter-real pool area storage table 224) which is set as the compressed page storage area.

An "uncompressed capacity" column 1216 stores the value of the uncompressed capacity out of the used capacities of the real pool. The uncompressed capacity can be obtained, for example, by totalizing the capacity of pages having the page status set to "unallocated" within the chunk set as the uncompressed page storage area (confirmed from the inter-real pool area storage table 224) regarding the real pool in the real pool capacity management table 223. In another example, the capacity can be obtained by subtracting the value in the "compressed capacity" column 1215 from the value in the "used capacity" column 1214.

For example, line 1217 indicates that real pool number "01" has the execution of compression "permitted", wherein the unused capacity is "25 TB", the used capacity is "75 TB", and within the used capacity, the compressed capacity is "35 TB" and the uncompressed capacity is "40 TB".

FIG. 13 shows a virtual volume management table 226.

A "real pool number" column 1310 stores the identification number of a real pool defined in the storage subsystem 103.

A "virtual VOL number" column 1311 stores the identification number of a virtual volume defined in the storage subsystem 103.

A "virtual area ID" column 1312 stores the identification number of a virtual area within the virtual volume.

A "page ID" column 1313 stores the page ID within the real pool allocated to the virtual area ID of the virtual volume. If there are multiple pages allocated to the virtual area, multiple page IDs are stored therein.

A "capacity (MB)" column 1314 stores the value of the capacity of the page allocated to the virtual area ID of the virtual volume.

A "compression flag" column 1315 stores a value for identifying whether compression processing has been executed or not with respect to the virtual area of the virtual volume. The value "0" indicates non-compression, and "1" represents compression.

For example, column 1316 indicates that the page ID "00001" is allocated to the virtual area ID "1" of virtual volume number "001" of real pool number "01", the capacity thereof is "100" MB, and that compression has not been executed.

FIG. 14 illustrates a virtual volume average compression rate management table 227.

The virtual volume average compression rate management table 227 associates a "virtual VOL number" column 1411 and an "average compression rate" column 1412, and manages the same.

The "virtual VOL number" column 1411 stores the identification number of the virtual volumes defined in the storage subsystem 103.

An "average compression rate" column 1412 stores the value of the average compression rate of the virtual volume. The average compression rate can be computed by comparing the capacity (after compression) of the virtual area ID having the compression flag set to 1 with the capacity prior to compression of the relevant virtual volume number in the virtual volume management table 226 of FIG. 13. The actual method for calculation is shown below.

The virtual areas where the real pool number 1310 is 01 and the compression flag is 1 within the virtual volume management table 226 are extracted per virtual VOL number. In FIG. 13, two virtual areas of lines 1318 and 1319 of virtual volume number "002" satisfy the above-described conditions.

Since the total capacity after compression of the areas is 30 MB+20 MB=50 MB, and the total capacity prior to compression is 100 MB+100 MB=200 MB, the average compression rate of virtual volume number "002" in real pool number 01 can be computed as 50 MB/200 MB=0.25 (25%), and therefore, the average compression rate of virtual volume number "002" of line 1414 of FIG. 14 will be "25%".

In line 1413 of FIG. 14, the average compression rate of virtual volume number "001" is "-", indicating that there is no compressed page.

The timing for computing or updating the average compression rate can be the timing of S1714 of FIG. 17 described later, or can be performed via other various cycles.

FIG. 15 illustrates a compression target volume management table 228.

The compression target volume management table 228 associates, for example, a "compression target priority" column 1511, a "virtual VOL number" column 1512, and a "compression permission status" column 1513, and manages the same.

The "compression target priority" column 1511 has numbers assigned thereto starting from 1, for example.

The "virtual VOL number" column 1512 stores, for example, the identification number of a virtual volume.

The "compression permission status" column 1513 stores, for example, the information on whether the volume has been selected as a compression permitted volume or a compression prohibited volume based on compression target volume selection 530 of the compression setting screen 500.

For example, line 1514 shows that the virtual volume number having 1 as the compression target priority is "002", and that the volume has been given compression permission by the user. Further, line 1515 indicates that the virtual volume number having 3 as the compression target priority is "005" and the volume has not been defined by the user whether compression is available or not. In the present embodiment, the volume that has not been designated is managed as a volume having the second high compression target priority next to the volume having compression permission.

Figure 16:
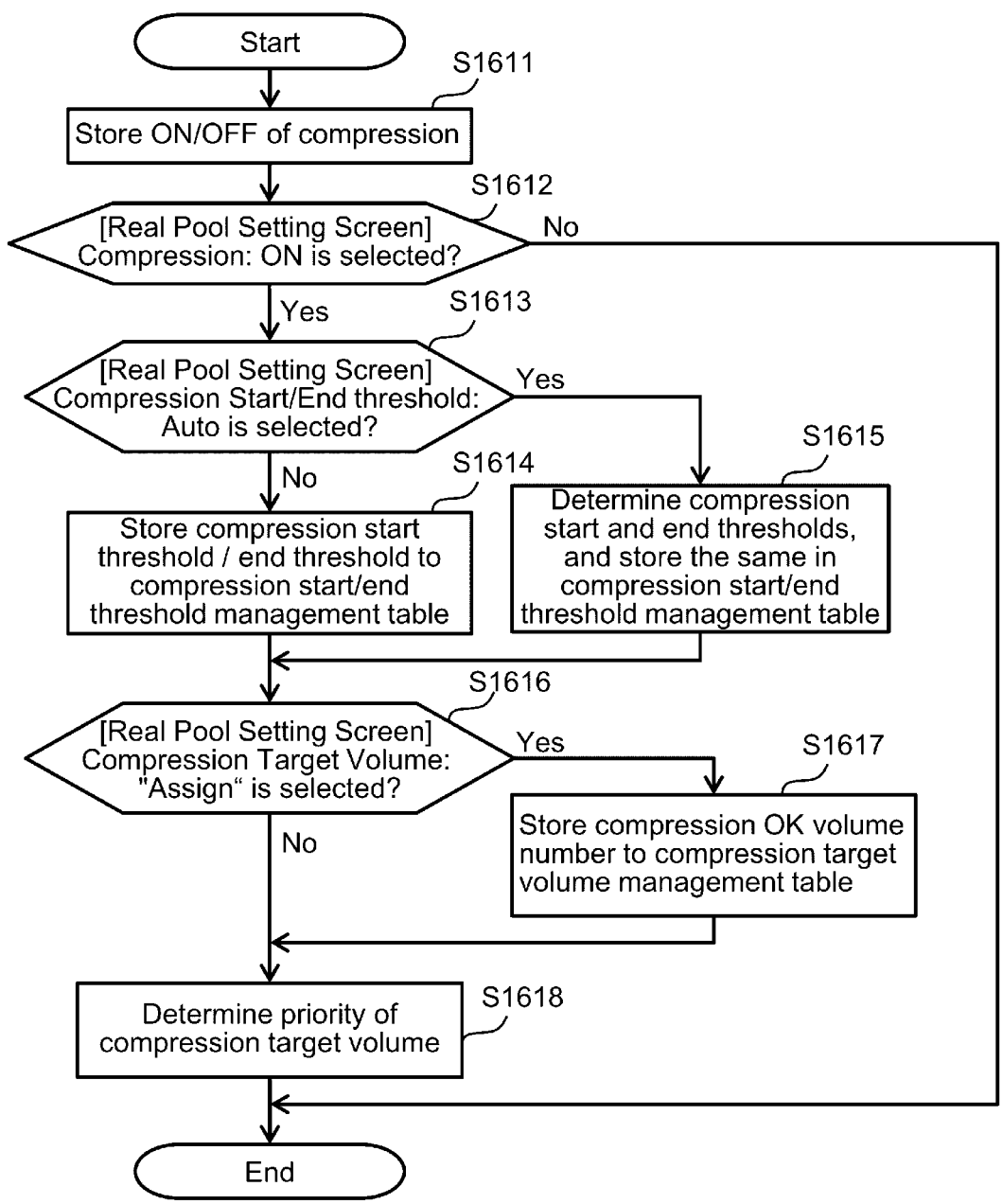
FIG. 16 is an example of a flowchart showing a compression setup registration processing according to embodiment 1 of the present invention.

FIG. 16 is a flowchart showing the flow of real pool compression according to the first embodiment. This processing can be started when the compression setting registration program 214 receives the content entered in the input screen of FIG. 5 from the management computer 102 via the management computer communication program 211.

(S1611) The compression setting registration program 214 stores the content selected via the compression selection radio button 510 (ON or OFF) to a "compression availability" column 1212 of the real pool capacity management table 225.

(S1612) The compression setting registration program 214 advances to S1613 if "ON" is selected via the compression selection radio button 510, and ends the process if "OFF" is selected.

(S1613) The compression setting registration program 214 advances to S1614 if "Manual" is selected via a compression start/end threshold radio button 520, and advances to S1615 if "Auto" is selected.

(S1614) The compression setting registration program 214 enters the contents of entry of the compression start threshold entry box 521 and the compression end threshold entry box 522 to the "compression start threshold" column 912 and the "compression end threshold" column 913 of the compression start/end threshold management table 222, and advances to S1616.

(S1615) The compression setting registration program 214 determines the "compression start threshold" column 912 and the "compression end threshold" column 913 via a given method, and advances to S1616.

According to one possible method, values obtained by subtracting uniform values from the "capacity depletion threshold" column 812 defined in the real pool capacity depletion threshold management table 221 are stored in the "compression start threshold" column 912 and the "compression end threshold" column 913, or even further, the value obtained by calculating −10% of the capacity depletion threshold is stored in the "compression start threshold" 912 and the value obtained by calculating −20% of the capacity depletion threshold is stored in the "compression end threshold" column 913.

There is also a criteria regarding whether or not it can endure past unexpected increase of data. For example, it is possible to acquire the access history of the real pool, calculate the amount of data increased per unit time based on past history, compute the average increase rate of the period of time where the increase rate is especially high (the highest 10%, for example), and to set up a threshold capable of ensuring the time for completing the compression without the real pool capacity being depleted even if the time computed by multiplying a safety factor K to the maximum value of continuous increase time via the computed increase rate.

(S1616) The compression setting registration program 214 advances to S1617 if "assign" is selected via the compression target volume radio button 530, and advances to S1618 if "not assign" is selected.

(S1617) The compression setting registration program 214 stores the virtual volume included in the compression permission virtual volume list 531 as "permitted" and the virtual volume included in the compression prohibition virtual volume list 533 as "prohibited" in the "compression permission status" column 1513 of the compression target volume management table 228, and advances to S1618.

(S1618) The compression setting registration program 214 determines the "compression target priority" column 1511 of the compression target volume management table 228, and ends the process.

According to the compression priority, for example, at first the virtual volumes having the "compression permission status" column 1513 set to "permitted" are set to have priority in the order of the virtual VOL number, and thereafter, the virtual volumes having the "compression permission status" column 1513 set to "not assigned" are set to have priority in the order of the virtual VOL number. Virtual volumes having the "compression permission status" column 1513 set to "prohibited" are the virtual VOLs having low priority, but as for the virtual volume in which compression is "prohibited", it is also possible to determine not to perform compression thereof without setting the compression target priority 1511. Further, the virtual volumes being the compression target can be restricted to those where the "compression permission status" column 1513 is set to "permitted".

Further, regarding the method for determining the priority order among virtual VOLs having the same "compression permission status", it is possible to prioritize the virtual volume having smaller average compression rates by referring to the "average compression rate" column 1412 of the virtual volume average compression rate management table 227, other than setting the priority order based on the virtual VOL number as described earlier. The reason for this is because volumes having smaller average compression rates can be expected to have greater compression effects.

It is also possible to measure the access frequency of each virtual volume and prioritize compression of the virtual volumes having lower access frequencies. Further, it is possible to prioritize compression of the compressed capacity 1215 computed in S1714 having a low ratio with respect to the used capacity 1214.

Figure 18:
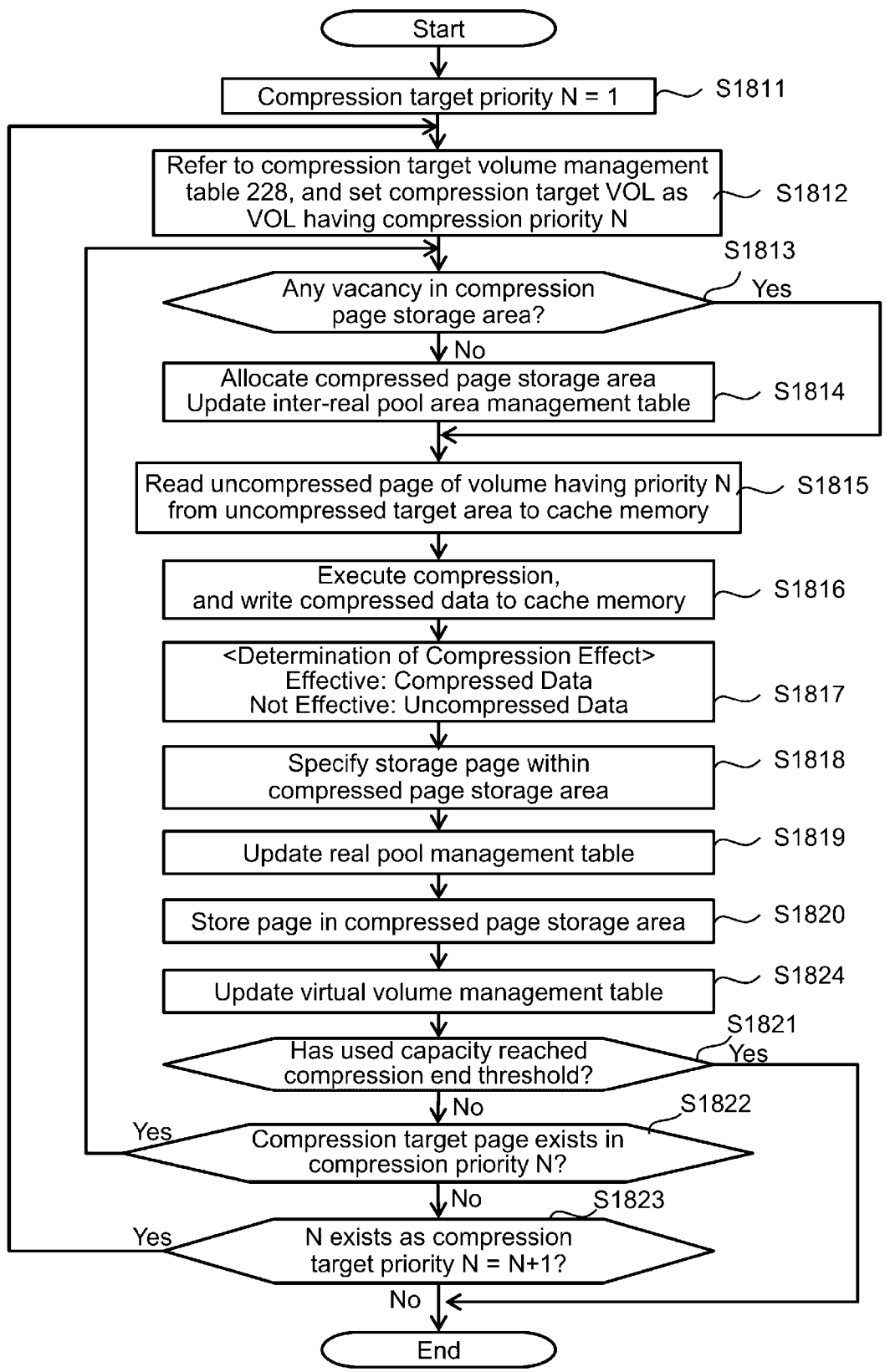
FIG. 18 is an example of a flowchart showing a compression processing according to embodiment 1 of the present invention.

The compression target volume management table 228 can be updated for example at timings S1811 and S1824 of FIG. 18, or at a timing when the change of availability of compression of the virtual volume is received via the management computer 102.

The present embodiment assigns the compression target priority to each virtual VOL unit, but it is also possible to assign the compression target priority to each virtual area. In that case, for example, the access frequency is computed for each virtual area, and the virtual area having a low access frequency can be set as the virtual area having a high compression target priority.

Figure 17:
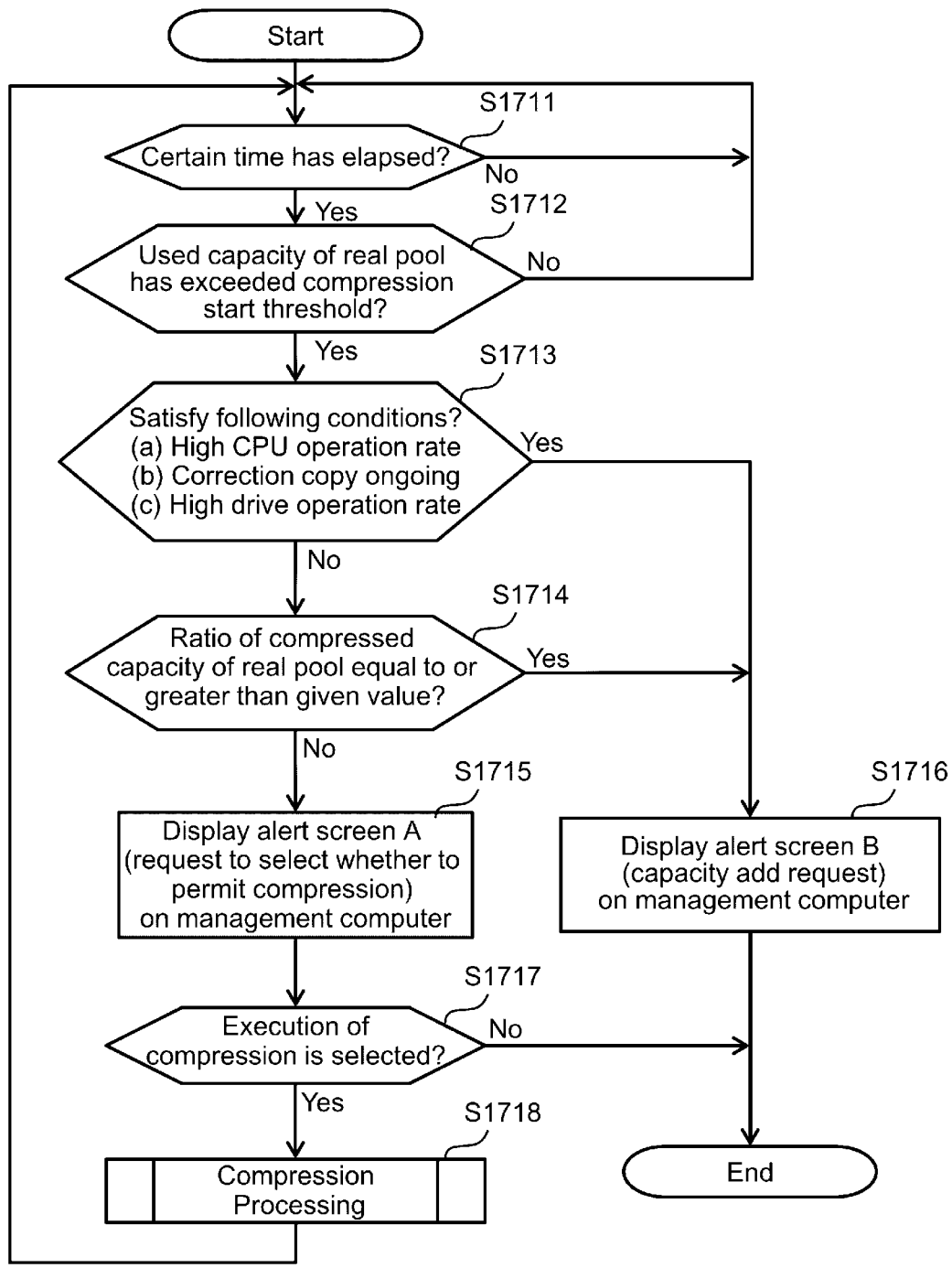
FIG. 17 is an example of a flowchart of compression execution determination processing according to embodiment 1 of the present invention.

FIG. 17 is a flowchart showing the flow of a compression execution determination processing of a real pool according to the first embodiment. This process is started for example when the operation of the storage subsystem 103 is started.

(S1711) The compression program 215 awaits elapse of a certain time via monitoring a timer or the like, and if the determined time has elapsed, advances to S1712.

(S1712) The compression program 215 determines whether the real pool usage rate (%) has exceeded the compression start threshold 912 or not, wherein the program advances to S1713 if the threshold is exceeded (Yes) and advances to S1711 if the threshold is not exceeded (No).

(S1713) The compression program 215 confirms the status of resources such as the CPU 125 of the storage subsystem 103, determines whether sufficient resource can be allocated for executing compression, wherein the program advances to S1716 if resource insufficiency is concerned (Yes) and advances to S1714 if resource insufficiency is not concerned (No).

S1713 has the following determination criteria, for example:

(a) whether the operating rate of the CPU has exceeded a predetermined threshold or not;

(b) whether a process having a high priority determined in advance, such as a failure recovery process, is on-going or not; and (c) whether the operating rate of the drive has exceeded a predetermined threshold or not.

The present embodiment illustrates an example where the procedure advances to S1716 immediately when S1713 is Yes, but it is also possible to count the number of times Yes is selected in S1713 and return to S1711, and to move on to S1716 only when the number has exceeded a determined number of times. This is because regarding temporary increase of CPU usage rate, it is necessary to perform determination while continuously monitoring the usage rate.

(S1714) The compression program 215 determines whether the ratio of the compressed capacity 1215 with respect to the used capacity 1214 out of the used capacity of the relevant real pool has exceeded a given value or not, wherein the program advances to S1716 if the ratio exceeds the value (Yes) and advances to S1715 if the ratio does not exceed the value (No).

As the ratio of the compressed capacity in the used capacity within the real pool increases, the effect of reduction of data quantity by compression minimizes, so that if it is possible to determine in advance that the effect of compression is small, the present process determines to prompt addition of capacity without performing compression.

As for the determination method of S1714, it is possible to set up a threshold to the ratio of compressed capacity, and to not perform compression when the threshold is exceeded. Further, as in the following example, it is possible to compute the expected value of usage rate when compression is executed, and to set whether the usage rate can fall below the compression end threshold as the determination criteria.

Based on line 1217 of FIG. 12, real pool 01 is a real pool having compression permission with an unused capacity of 25 TB and a used capacity of 75 TB, so that the usage rate of the real pool is 75%. As for the used capacity 75 TB, the capacity being compressed is 35 TB and the uncompressed capacity is 40 TB.

Based on line 914 of FIG. 8, real pool 01 has a compression start threshold of 70% and a compression end threshold of 60%, so that the compression program 215 can determine that the usage rate of the real pool has exceeded the compression start threshold (75%>70%).

In the determination of S1714, the compression program 215 computes an average compression rate p of real pool 01, computes the used capacity after compression as 35 TB+40 TB×p, and performs determination based on whether the computed result falls below 60% (that is, 60 TB) which is the compression end threshold.

(S1715) The compression program 215 displays the alert screen A 610 on the management computer 102 via the management IF 123, and advances to S1717 after receiving operation input from the management computer 102. If compression can to be started automatically, the present step can be omitted.

(S1716) The compression program 215 displays the alert screen B 620 on the management computer 102 via the management IF 123, and ends the process when operation input is received.

(S1717) The compression program 215 advance to S1718 if the operation input of S1715 is execute compression (Yes), and if not (No), ends the process. As described in S1715, if compression can to be started automatically, the present invention can be omitted.

(S1718) The compression program 215 executes compression processing, and returns to S1711 after the processing is completed. The compression processing will be described with reference to FIG. 18.

FIG. 18 is a flowchart showing the flow of compression processing of a real pool according to the first embodiment.

(S1811) The compression program 215 sets the compression target priority N to 1.

(S1812) The compression program 215 refers to the compression target volume management table 228, and determines the virtual volume being the next compression target as the volume having the priority N (=1).

(S1813) The compression program 215 confirms whether there is vacancy in the compression page storage area, wherein the program advances to S1814 if there is no vacancy (No), and advances to S1815 if there is vacancy (Yes).

Actually, the compression program 215 confirms via the inter-real pool area management table 224 regarding the chunk ID in which the "attribute" column 1113 is set to "compressed page storage area" whether there is a page in which the "page status" column 1015 of the real pool management table 223 is set to "unallocated". For example, if the compression of real pool 01 is performed, it can be recognized from line 1116 of FIG. 11 that the chunk having a chunk ID "0002" is the compressed page storage area, and it can be recognized from line 1019 of FIG. 10 that an unallocated page remains in the chunk of the chunk ID "0002".

(S1814) The compression program 215 refers to the inter-real pool area management table 224 of FIG. 11, and newly defines a chunk having an undefined purpose of use as a compressed page storage area. For example, the attribute of the chunk where the attribute of the inter-real pool area management table 224 is set to "vacant area" is changed to "compressed page storage area".

Further, the compression program 215 adds a line as shown below to the real pool management table 223 of FIG. 10 for a number corresponding to the value obtained by dividing the size of the chunk by the page size, which is 10 MB.

(1) Chunk ID column: Chunk ID newly defined as compressed page storage area
(2) Page ID column: Arbitrary page ID
(3) Physical address column: Value divided so that the capacity becomes 10 MB
(4) Page status column: Unallocated
(5) Capacity column: 10 MB When the undefined chunk is managed via page units in advance, the pages must either divided or integrated so as to change the page size of the undefined chunk to 10 MB, which is the size of the page of the compressed page storage area.

(S1815) The compression program 215 acquires the virtual VOL number where the "compression target priority" column 1511 of the compression target volume management table 228 is "N" (1 in the present example), and selects one virtual area ID from the virtual volume management table 226 having a corresponding virtual VOL number and having the "compression flag" column 1315 set to "0". The method for selection can be, for example, based on the ascending order of the "virtual area ID". Further, it is possible to store the access frequency of each virtual area and to perform selection from the virtual area having a low access frequency.

As shown in FIG. 4, the page selected here is included in the uncompressed page storage area 421, and the data 442 stored in the selected compression target page 441 is written into the cache memory 127 as a compression target data 442. Now, actually, the compression target page 441 has a physical area of the storage device 130 or the area of the cache memory 127 allocated thereto, and the controller 120 manages the allocation. In other words, according to the above-described staging, if the compression target page 441 already exists in the cache memory 127, no data is newly written into the cache memory 127.

(S1816) The compression program 215 performs data compression entering the compression target data 442 in the cache memory 127 as shown in FIG. 4, and a compressed data 443 obtained as a result of computation is written into the cache memory 127. Here, the algorithm for compression is not especially restricted.

(S1817) The compression program 215 computes the size of the page written into the cache memory 127 in S1816, and if there is no change before and after compression, the program determines that there is no compression effect, and stores the uncompressed data to the compressed data storage area. This step is performed to cut down the time required for decompression processing if there is no capacity reduction effect.

For example, one possible example of such case is where the page prior to compression is 100 MB, which can be reduced to 95 MB by compression, but since the compressed pages are in 10 MB units, the data still uses a capacity of 10 MB×10 pages=100 MB even after compression.

(S1818) The compression program 215 selects one or multiple unallocated pages of the chunk in which the attribute is a compression page storage area from the real pool management table 223 allocated in S1813 or S1814.

(S1819) The compression program 215 changes the "page status" column 1015 of the real pool management table 223 regarding the page selected in S1818 to "reserved".

(S1820) The compression program 215 writes a compressed data 443 (FIG. 4) written into the cache memory 127 in S1816 to the physical area in the storage device 130 (compressed data storage page 444 of FIG. 4) corresponding to the "physical address" column 1014 of the page selected in S1818, as in FIG. 4, and changes the "page status" column 1015 of the real pool management table 223 to "allocate".

(S1824) The compression program 215 changes the line of the virtual area ID selected in S1815. The page ID stored in S1820 is written to the page ID column 1313, the capacity of the page written in the capacity (MB) column 1314 (if there are multiple pages, the total capacity thereof) is stored in the capacity (MB) column 1314, and the compression flag column 1315 is changed from "0" to "1".

Now, even if there is no capacity reduction effect due to compression as described in S1817 and uncompressed data has been stored, the compression program 215 changes the "compression flag" column 1315 of the virtual volume management table 226 to "1". Further, the compression program 215 deletes the data stored in the uncompressed page 441 where uncompressed data is stored, and changes the "page status" column 1015 of the uncompressed page 441 of the real pool management table 223 to "unallocated".

(S1821) The compression program 215 computes the real pool usage rate using the method described in S1712, determines whether the real pool usage rate falls below the "compression end threshold" column 913 of the compression start/end threshold management table 222, wherein the program ends the process if the rate falls below the value, and advances to S1822 if the rate does not fall below the value.

(S1822) The compression program 215 advances to S1813 if there is a virtual area other than the area selected in S1815 having the "compression flag" column 1315 of the virtual volume management table 226 set to "0", and advances to S1823 if not.

(S1823) The compression program 215 adds 1 to N (N=2), wherein if a virtual volume having N as the compression target priority exists within the compression target volume management table 228, the program returns to S1812, and if not, the program ends the process. The determination of S1821 can be performed after S1822.

According to the present embodiment, compression processing has been performed in volume units, but as shown in FIG. 16, when compression target priority is assigned to each virtual area, compression processing can be performed in virtual area units. In that case, in S1812, the compression target virtual area is set as the virtual area having compression priority N, and the determination of S1822 is not required, so the procedure advances to S1823.

In a storage subsystem in which the virtual VOL, which is a thin-provisioning volume, is provided to the user, even if there is allowance in the virtual remaining capacity in the virtual VOL used by the user, it may be possible that there is no allowance in the remaining capacity of the real pool providing the actual area. If the virtual VOL is used continuously in such state, the real pool will be depleted, and an error may occur in the storage subsystem.

The above-described problem can be solved by adding capacity, but in order to lower the management costs, it is preferable not to add capacity. A method is considered to compress the data as a technique to create vacant areas and to enhance the capacity efficiency. However, if the whole real pool is compressed, a drawback occurs in which the performance of response to the virtual VOL currently being used is delayed.

In the present embodiment 1, in order to solve this problem, the virtual volume having a low priority is compressed but the volume having a high priority is not compressed, so as to allow use of the page of the real pool. Thereby, it becomes possible to solve the contradictory problems of depletion of the real pool while enhancing the capacity efficiency and maintaining the response performance.

Especially when the priority is set in virtual volume units, since the required access performance varies according to use, the deterioration of performance can further be suppressed. For example, the property of access differs according to the purpose of the volume, and if the volume is used as a backup volume storing backup data, the volume will not be frequently accessed normally, while on the other hand, if the volume is used as a primary volume, it will be accessed frequently. Therefore, compression is prohibited regarding the volume having a high access, and compression is permitted regarding the volume expected to have a small access, so that the deterioration of performance by compression can be suppressed.

On the other hand, in many cases, the purpose of use of the storage is not specified at the stage of designing the storage capacity, so it is not possible to determine whether to permit compression or not. Further, if there are a large number of volumes to be defined, it is not easy to determine whether to permit compression for all volumes, and the setting operation takes much time. Therefore, by considering the "undefined" volumes and setting priority orders thereof as according to the present invention, it becomes possible to facilitate definition of the compression availability.

In other words, even if the requested performance of the volumes is recognized, the user can intentionally not set whether to permit compression of the virtual volume, so as to "set" an intermediate property of compression prohibition and compression permission, and to adjust the level of performance deterioration caused by compression of the virtual volume according for example to the importance of the virtual volume and the like.

Embodiment 2

According to embodiment 1, performance deterioration is suppressed by setting a compression end threshold and not performing compression more than necessary. In the second embodiment 2, when unused capacities in the real pool are excessive due to capacities added to the real pool or virtual volumes being deleted, the capacities are de-compressed actively to suppress the deterioration of performance caused by compression. The properties of the second embodiment that differ from the first embodiment will be described with reference to FIGS. 19 through 23.

Figure 19:
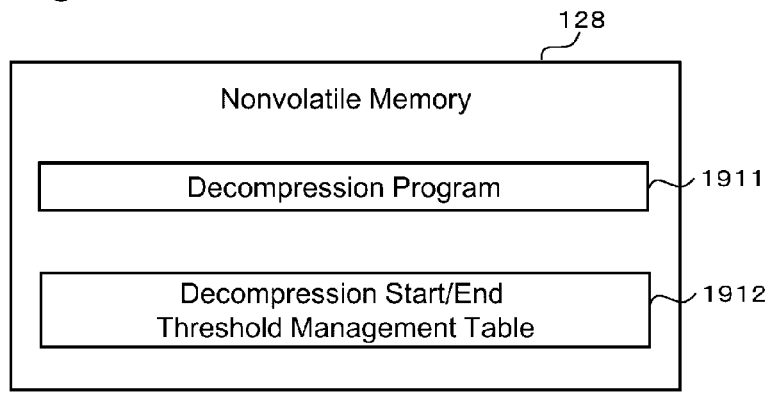
FIG. 19 is an explanatory view showing a configuration of a program and a table stored to the nonvolatile memory 128 in addition to FIG. 2 according to embodiment 2 of the present invention.

FIG. 19 is an explanatory view showing a program and a table configuration retained according to embodiment 2 in the nonvolatile memory 128 in addition to the items illustrated in FIG. 2.

A decompression program 1911 is a program being executed by the CPU 125 for de-compressing entered data elements. The details of the processing of this program will be described with reference to FIG. 22.

A decompression start/end threshold management table 1922 is a table for storing a decompression start threshold and a decompression end threshold for each real pool. The details of this table will be described with reference to FIG. 21.

Figure 20:
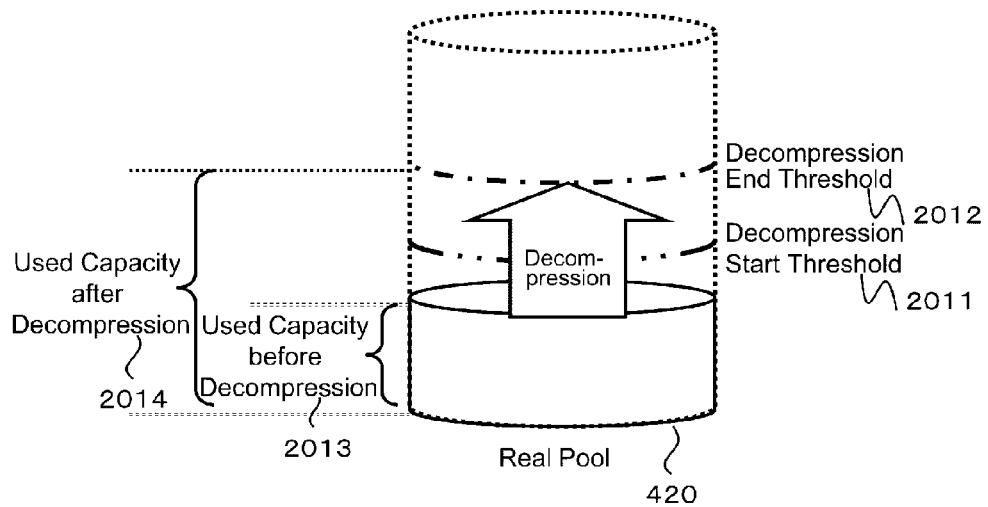
FIG. 20 is an explanatory view showing the relationship between start and end of decompression processing of data within the real pool corresponding to capacity threshold according to embodiment 2 of the present invention.

FIG. 20 is an explanatory view showing in frame format the relationship between the decompression start threshold and the decompression end threshold of real pool 420, and the relationship between the used capacities before and after decompression.

The decompression start threshold 2011 and the decompression end threshold 2012 show a "decompression start threshold" column 2112 and a "decompression end threshold" column 2113 of a decompression start/end threshold management table 1912 of FIG. 21. The decompression end threshold 2012 is a higher value than the decompression start threshold 2011.

In S2212 described later, when the real pool usage rate falls below the decompression start threshold 2011, decompression processing is started, and when the real pool usage rate exceeds the decompression end threshold 2012, the decompression is ended.

FIG. 21 illustrates a decompression start/end threshold management table 1912.

A "real pool number" column 2111 stores the identification number of the real pool defined in the storage subsystem 103.

A "decompression start threshold" column 2112 stores the usage rate of the compression real pool that triggers start of decompression.

A "decompression end threshold" column 2113 stores the usage rate of the compression real pool that triggers end of decompression.

For example, line 2114 indicates that the decompression start threshold of real pool number "01" is "30%" and the decompression end threshold thereof is "40%". In other words, the storage subsystem 103 starts decompression when the used capacity of real pool number 01 falls below 30% of the capacity of the whole real pool, and ends the decompression processing when it exceeds 40%.

Figure 22:
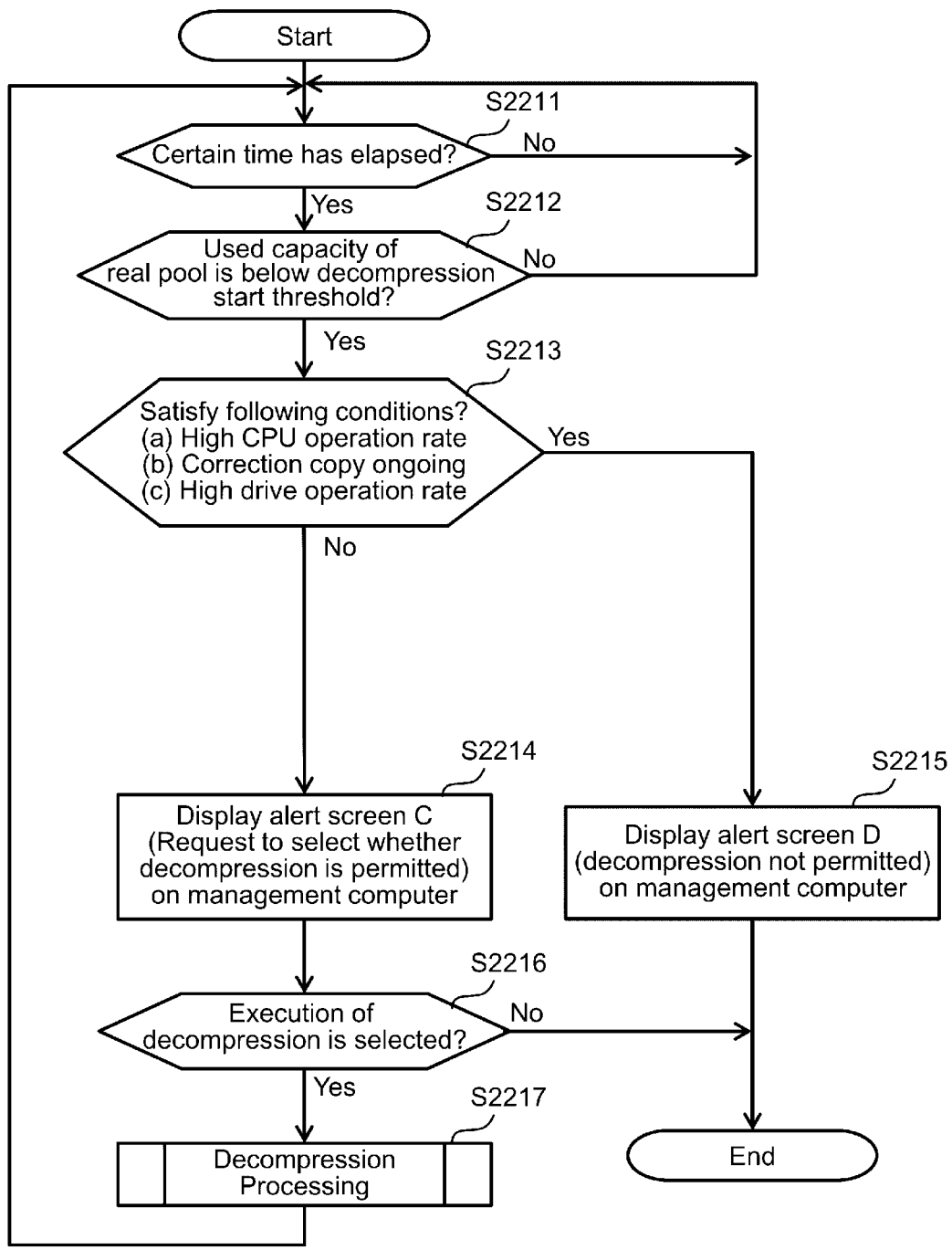
FIG. 22 is an example of a flowchart illustrating a decompression execution determination processing according to embodiment 2 of the present invention.

FIG. 22 is a flowchart illustrating the flow of decompression execution determination process of a real pool according to the second embodiment. This process is started, for example, when the operation of the storage subsystem 103 is started. This process can be executed in parallel to the flowchart of FIG. 17 described in embodiment 1.

(S2211) The decompression program 1911 awaits elapse of a determined time via monitoring of a timer or the like, and when a determined time has elapsed, advances to S2212.

(S2212) The decompression program 1911 determines whether the real pool usage rate (%) has fallen below the decompression start threshold 2011 or not, wherein if it has fallen below the threshold (Yes), the program advances to S2213, and if not (No), the program advances to S2211.

(S2213) The decompression program 1911 confirms the state of resources of the storage subsystem 103 to determine whether sufficient resources can be secured for executing compression, wherein if lack of resources is concerned (Yes), the program advances to S2215, and if lack of resources is not concerned (No), the program advances to S2214. The determination criteria are similar to 1713 of FIG. 17.

(S2214) The decompression program 1911 displays an alert screen C on the management computer 102 via the management IF 123. The alert screen C is a screen for confirming whether execution of decompression processing is possible or not, and the detailed description thereof is omitted since it is similar to the alert screen A of FIG. 6. The program advances to S2216 when an operation input is received from the management computer 102. An alert is output according to the present invention, but the process can be performed automatically without outputting an alert.

(S2215) The decompression program 1911 displays an alert screen D on the management computer 102 via the management IF 123. The alert screen D is a screen for notifying that the execution of decompression processing is not possible, and the detailed description thereof is omitted since it is similar to the alert screen B of FIG. 6.

(S2216) If the operation entered in S2214 is execute decompression (Yes) the program advances to S2217, and if not (No), the process is ended. If the alert is omitted in S2214, the present step will also be omitted.

(S2217) The program executes the decompression processing, and after execution, the program returns to S2211. The decompression processing will be described with reference to FIG. 23.

Figure 23:
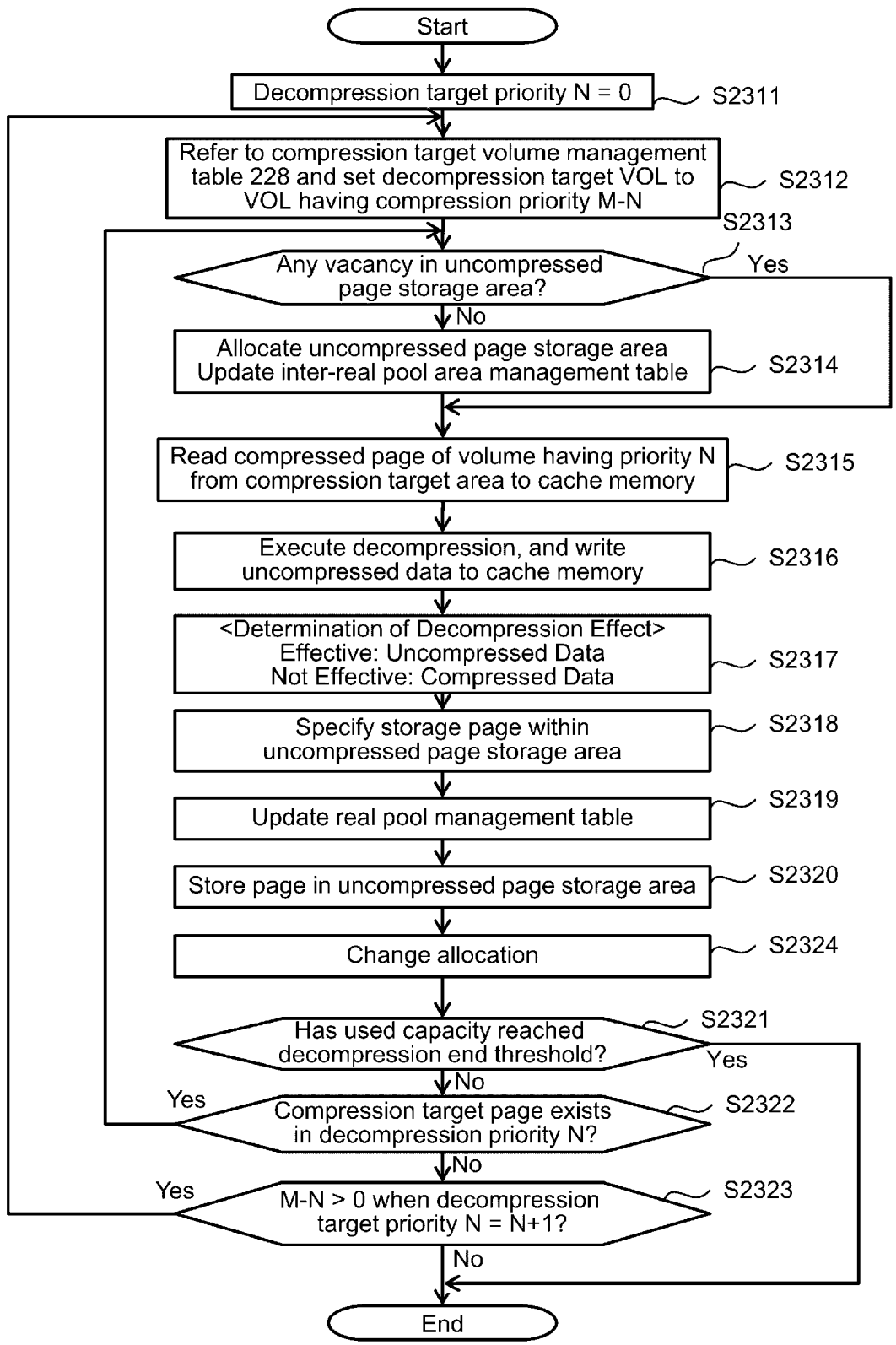
FIG. 23 is an example of a flowchart showing a decompression processing according to embodiment 2 of the present invention.

FIG. 23 is a flowchart showing the flow of execution of the decompression processing of a real pool according to the second embodiment.

(S2311) The decompression program 1911 sets a decompression target priority N to 0.

(S2312) The decompression program 1911 sets a virtual volume being the next target of decompression as a virtual volume having a compression target priority "M−N", assuming that the maximum value of a "compression target priority" column 1511 of the compression target volume management table 228 is "M". According to the present example, the decompression priority is set to be higher in order from those having lower compression priority, but it is also possible to provide an independent table storing the decompression priority.

(S2313) The decompression program 1911 confirms whether there is vacancy in the uncompressed page storage area, wherein if there is no vacancy (No), the program advances to S2314, and if there is vacancy (Yes), the program advances to S2315. The method for confirming vacancy of the uncompressed page storage area is the same as the method for confirming vacancy of a storage area of a compressed page in S1813 of FIG. 18.

(S2314) The decompression program 1911 newly defines the chunk having its usage undefined as an uncompressed page storage area. The method is similar to defining a compressed page storage area in S1814 of FIG. 18.

(S2315) The decompression program 1911 acquires a virtual VOL number in which the compression target priority is "M−N" assuming that the greatest value of the "compression target priority" column 1511 of the compression target volume management table 228 is "M", and selects a single virtual area ID from the virtual volume management table 226 having a corresponding virtual VOL number and has "1" stored in the "compression flag" column 1315. Moreover, the decompression target data of the compressed data storage page 444 is read into the cache memory 127 via the opposite procedure as the procedure stated in S1815 of FIG. 18.

(S2316) The decompression program 1911 performs data decompression setting the decompression target data 443 in the cache memory 127 as input, and writes the uncompressed page 442 obtained as a result of computation to the cache memory 127.

(S2317) The decompression program 1911 computes the size of the page being written into the cache memory 127 in S2316, and if the sizes are not changed before and after decompression, determines that there is no decompression effect, and stores the compressed data as it is in the uncompressed data storage area. This includes a case where the data is not compressed from the beginning.

(S2318) The decompression program 1911 selects one or multiple unallocated pages of the chunk in which the attribute is uncompressed page storage area from the real pool management table 223 allocated in S2313 or S2314.

(S2319) Regarding the page selected in S2318, the decompression program 1911 changes the "page status" column 1015 of the real pool management table 223 to "reserved".

(S2320) The decompression program 1911 writes the uncompressed page written into the cache memory 127 in S2316 to the physical area in the storage device 130 corresponding to the "physical address" column 1014 of the page selected in S2318, and changes the "page status" column 1015 of the real pool management table 223 to "allocated".

(S2324) The decompression program 1911 changes the row of the virtual area ID selected in S2315. The decompression program 1911 stores the ID of the page storing data in S2320 into the "page ID" column 1313, stores the capacity of the page (the total capacity if there are multiple pages) stored in the "capacity (MB)" column 1314, and changes the "compression flag" column 1315 from "1" to "0".

Now, even if there is no decompression effect by decompression as described in S2317 and the uncompressed data is stored, the decompression program 1911 changes the compression flag to "0". Further, the decompression program 1911 deletes the data of the compressed page storing uncompressed data, and changes the "page status" column 1015 in the real pool management table 223 of the compressed page where the data is deleted to "unallocated".

(S2321) The decompression program 1911 computes a real pool usage rate to determine whether the real pool usage rate exceeds the "decompression end threshold" column 2113 of the decompression start/end threshold management table 1912, wherein if the rate falls below the threshold, the program ends the process, and if not, the program advances to S2322.

(S2322) The decompression program 1911 advances to S2313 if there is a virtual area in which the "compression flag" column 1315 is set to "1" in the virtual volume management table 226 other than the area selected in S2315, and if not, advances to S2323.

(S2323) The decompression program 1911 adds 1 to N, wherein if M−N>0 (Yes), the program returns to S2312, and if M−N=0 (No), the program ends the process. The determination of S2321 can be performed after S2322.

Embodiment 3

Now, the third embodiment of the present invention will be described with reference to FIG. 24, focusing only on the differences with respect to embodiments 1 and 2.

In embodiment 1, compression is performed only after the real pool usage rate has reached the compression start threshold, so that the CPU usage rate is increased significantly after reaching the compression start threshold, and the performance may be deteriorated. Therefore, according to embodiment 3, multiple compression start thresholds triggering start of compression are set, and when each compression start threshold is exceeded, the usage rate of the CPU is enhanced in a stepwise manner so as to prevent concentration of CPU load.

FIG. 24 illustrates a compression start/end multiple thresholds management table 2400 used in the third embodiment instead of the compression start/end threshold management table 222 of FIG. 8. The values of this table can be determined by the input from the management computer 102, similar to FIG. 8.

A "real pool number" column 2411 stores the identification number of the real pool defined in the storage subsystem 103.

A "compression start threshold 1" column 2412 stores a first compression real pool usage rate that triggers start of compression.

A "threshold 1 CPU usage rate" column 2413 stores the maximum value of CPU usage rate used for compression when the value has exceeded the "compression start threshold 1".

A "compression start threshold 2" column 2414 stores the compression real pool usage rate that triggers start of compression that differs from the "compression start threshold 1". In the example, the number of compression start thresholds is two, but it can be three or more.

A "threshold 2 CPU usage rate" column 2415 stores the maximum value of CPU usage rate used for compression when the value has exceeded the "compression start threshold 2". In the example, the number of threshold CPU usage rates is two, but it can be three or more.

A "compression end threshold 1" column 2416 stores a compression real pool usage rate that triggers end of compression corresponding to the "compression start threshold 1" column 2412. If there are two or more "compression start thresholds", multiple numbers of "compression end thresholds" corresponding thereto must be retained.

For example, line 2417 shows that in real pool number "01", if the real pool usage rate exceeds the first compression start threshold "50%", 20% of CPU is used to execute compression to perform compression processing until the usage rate reaches "30%", and if the real pool usage rate exceeds "60%" without reaching the compression end threshold 1, the CPU used for compression is increased to "40%" to continue compression.

FIG. 24 has illustrated a method for providing multiple compression start thresholds, but it is also possible to dispose multiple decompression start thresholds in a similar manner

Embodiment 4

The fourth embodiment of the present invention will be described with reference to FIGS. 25 and 26, focusing on the differences with respect to embodiments 1, 2 and 3.

In embodiment 1, the purposes of use of areas are managed in chunk units regarding non-compressed data and compressed data in the inter-real pool area management table 224, but in embodiment 4, the purposes are managed in page units. Further according to embodiment 1, the capacities of pages differ among non-compressed data areas of 100 MB and compressed data areas of 10 MB, but in the present embodiment, all the pages are set to have the same capacity.

Further, similar to the compression page of embodiment 1, the page capacity is set so that multiple pages can be allocated to a single virtual area. Further, since all pages have the same size, management is performed in page units before the purpose of the page is defined.

The method for managing the compression status according to the present embodiment will be described. Instead of managing each chunk considering whether they are for compressed data or for non-compressed data as in the inter-real pool area management table 224 of FIG. 11, the areas are managed considering whether they are for compressed data or for non-compressed data. For example, the real pool management table 223 is rewritten as shown in the real pool management table 2520 of FIG. 25. Actually, the state of allocation of page status 1015 in the real pool management table 223 is divided into two states, compression and non-compression, as in the "page status" column 2514.

Figure 26:
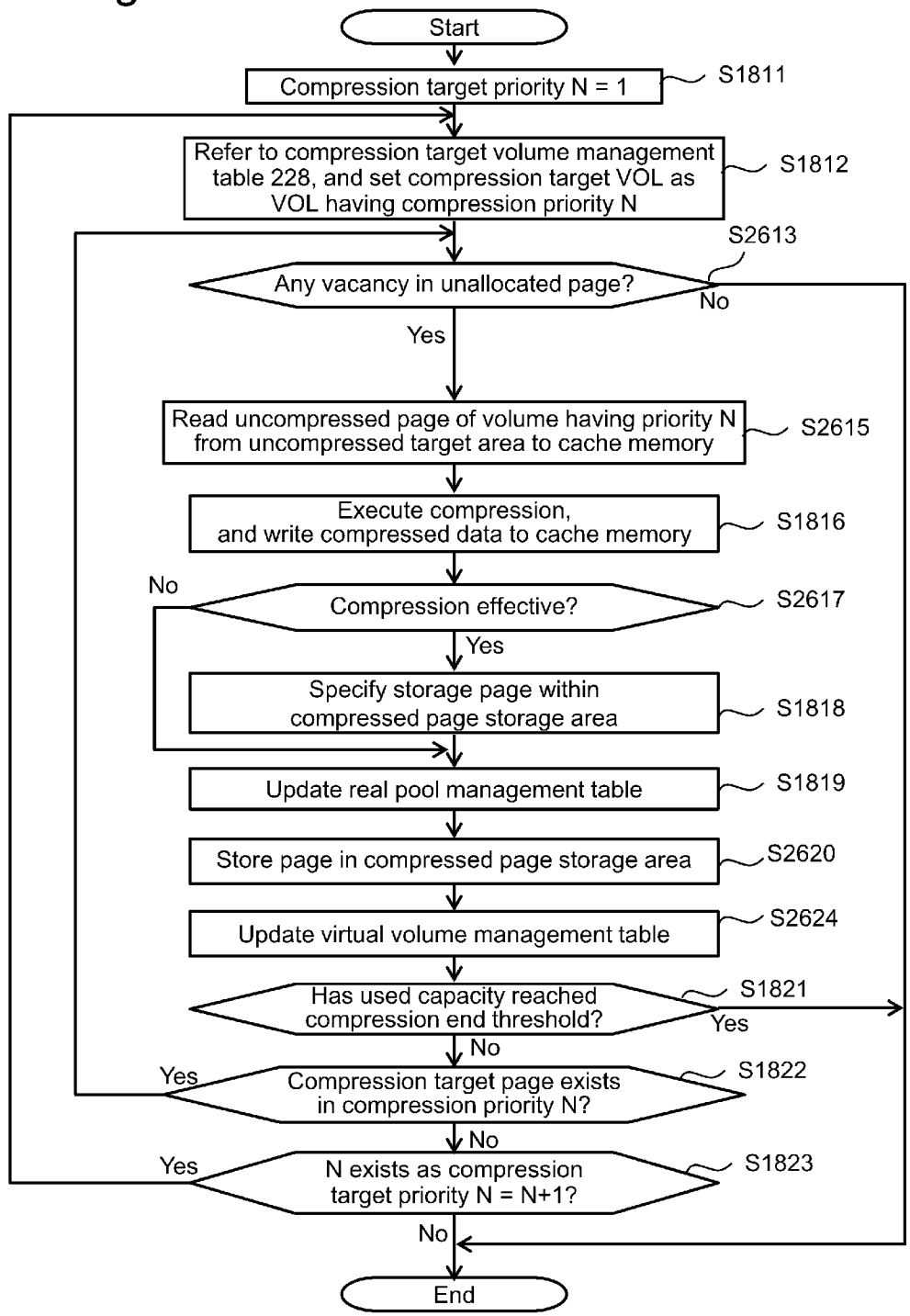
FIG. 26 is an example of a flowchart illustrating a compression processing according to embodiment 4 of the present invention.

Such as in a case where a page is allocated to a virtual area according to a write command transmitted from the host computer 101, except for the case where a page is allocated to a virtual area in S2620 and a change is performed in S2624 in the description of FIG. 26, the status of the allocated page is managed as "uncompressed". On the other hand, since there is no concept of a chunk, there is no column in the table corresponding to the chunk ID 1012. Further, similar to the "capacity" column 2515 of FIG. 25, all page capacities are the same, so the capacity column 2515 can be deleted.

Accompanying the above change, the calculation method of each column of the real pool capacity management table 225 shown in FIG. 12 is changed.

The used capacity 1214 can be computed based on the real pool management table 2520 by totalizing the capacity of pages in compressed status, uncompressed status and reserved status, or by multiplying the number of pages in compressed status, uncompressed status and reserved status by page capacity.

The compressed capacity 1215 can be computed based on the real pool management table 2520 by totalizing the capacity of pages in compressed status or by multiplying the number of pages in compressed status by page capacity.

The uncompressed capacity 1216 can be computed based on the real pool management table 2520 by totalizing the capacity of pages in uncompressed state or by multiplying the number of pages in uncompressed state by page capacity.

Next, the flow of compression processing according to the present embodiment will be described with reference to FIG. 26, focusing on the differences with embodiment 1.

In step S2613 having replaced S1813, the compression program 215 refers to the real pool management table 2520, and confirms whether there is vacancy in the unallocated page. If there is no vacancy, the process will be ended because compression processing cannot be performed. This is because all areas are managed in page units, and all unallocated pages can be used without performing the process of S1814 or the like. If there is vacancy, the program advances to S2615.

In S2615, the virtual area ID having the compression flag 1315 in the virtual volume management table 226 set to "0" is selected, similar to S1815. However, there may be a case where multiple pages are allocated to a single virtual area, and in that case, all the pages allocated to the selected virtual area are collectively written into the cache memory 127 as compression target data 442. Thereafter, S1816 performs a similar process as FIG. 18.

Next, S2617 is similar to S1817 in that whether compression is effective or not is determined, but if there is no compression effect, the present program does not perform steps S1818 and S1819. Since purpose of use of unallocated pages is not restricted for example to compressed or uncompressed data, if the data is left in the uncompressed state since compression is not effective, there is no need to re-write the uncompressed data to a new page, and the page in which the data has been originally stored can be used. If compression is effective, steps S1818 and S1819 are executed, similar to FIG. 18.

Thereafter, as a process S2620 performed instead of S1820, the compression program 215 writes a compressed data 443 written into the cache memory 127 in S1816 to the physical area in the storage device 130 corresponding to the "physical address" column 1014 of the page selected in S1818, and changes the "page status" column 2514 of the compressed data storage page 444 of the real pool management table 2520 to "compressed". If it is determined in S2617 that compression is not effective, data will not be rewritten, so that the "page status" column 2514 of all the pages allocated to the virtual area selected in the real pool management table 2520 is changed to "compressed".

(S2624) The compression program 215 changes the line of the virtual area ID selected in S2615. The page ID stored in S2620 is stored in the page ID column 1313 of the virtual volume management table 226, the capacity of the page (the total capacity if there are multiple pages) is stored in the capacity (MB) column 1314, and the compression flag column 1315 is changed from "0" to "1". Further, the compression program 215 deletes the data in the uncompressed page 441 storing uncompressed data, and changes the "page status" column 2514 of the uncompressed page 441 of the real pool management table 2520 to "unallocated".

The difference between the present step and S1824 is that when it is determined in S2617 that compression is not effective, data will not be rewritten, so that the compression program 215 changes the compression flag column 1315 of the virtual volume management table 226 of the virtual area ID selected in S2615 from "0" to "1". Furthermore, the compression program 215 changes the "page status" column 2514 of the row storing the uncompressed page of the real pool management table 2520 from "uncompressed" to "compressed". At this time, the compression program 215 will not erase data. The other processes are similar to embodiment 1.

As described, according to the present embodiment, the page size is common, so that it becomes unnecessary to manage the real pool in chunk units. Furthermore, pages can be allocated to the virtual area without having to change the purpose of use of chunks or determine page settings, as performed in S1814 of FIG. 18 of embodiment 1.

Embodiment 5

Now, embodiment 5 of the present invention will be described with reference to FIGS. 27 through 30, focusing on differences from embodiments 1, 2, 3 and 4.

Figure 27:
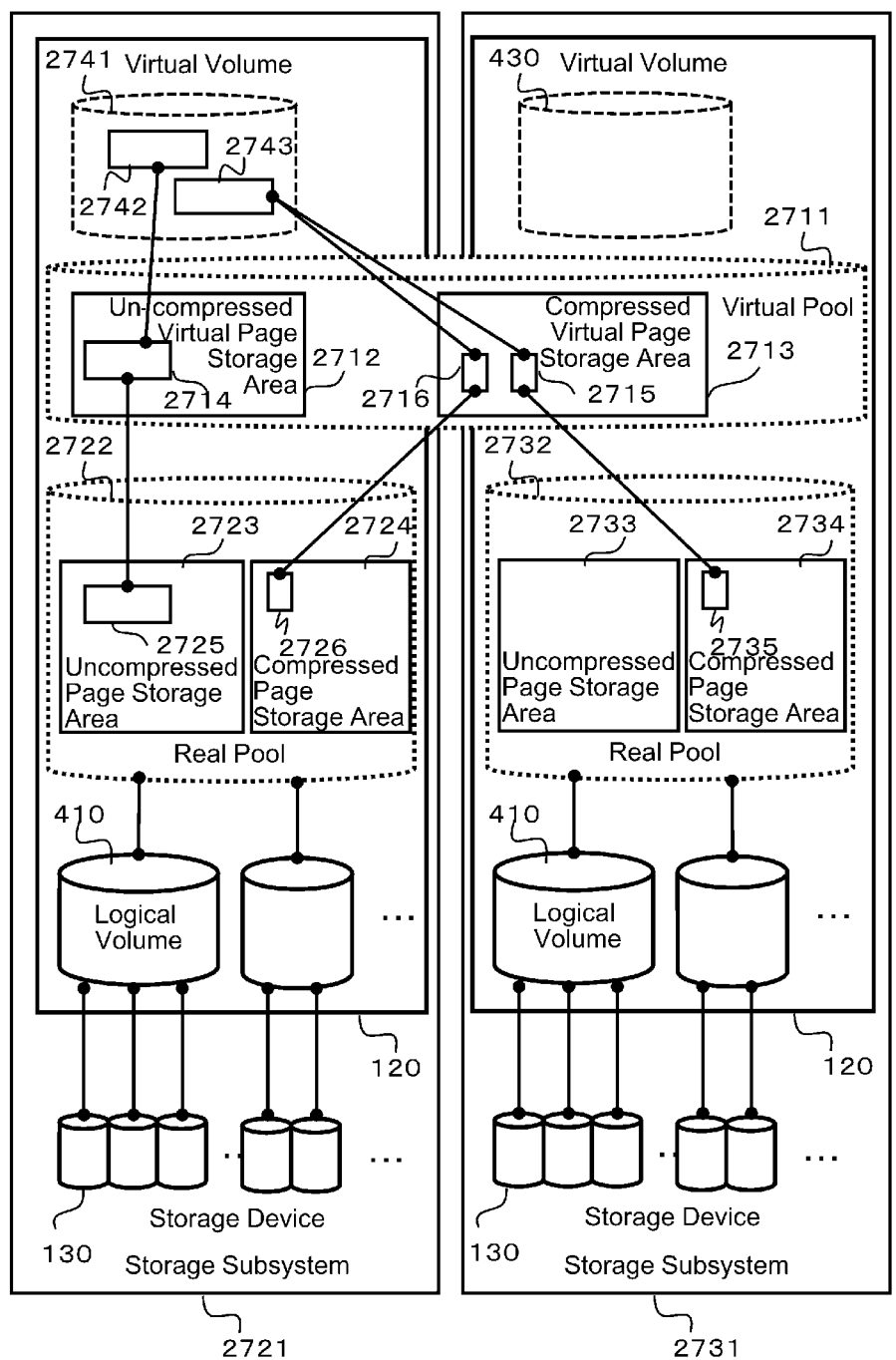
FIG. 27 is an explanatory view showing the relationship between virtual volumes, pages, real pools and storage devices and the operation for compressing pages according to embodiment 5 of the present invention.

As shown in FIG. 27, embodiment 5 assumes an environment where real pools 420 of multiple storage systems 103 are virtually managed in unified manner as a virtual pool 2711. By unifying the capacity management astride storage subsystems, the management of capacities of multiple storages can be facilitated. Further, since it is possible to use storage capacity of real pools of other storage subsystems astride storage subsystems, enhanced capacity efficiency can be expected.

FIG. 27 is an explanatory view showing in frame format the relationship between virtual volumes, pages, virtual pages, real pools, virtual pools and storage devices according to embodiment 5. The virtual volumes, pages, real pools and storage devices are the same as FIG. 4, so descriptions thereof are omitted.

A virtual pool 2711 is composed of one or a plurality of real pools 420, and the storage 103 to which the pages belong may differ. The virtual pool 2711 is further divided into one or more storage areas and managed in that manner.

In the example of FIG. 27, the virtual pool 2711 is divided into an uncompressed virtual page storage area 2712 and a compressed virtual page storage area 2713. The uncompressed virtual page storage area 2712 and the compressed virtual page storage area 2713 are divided into one or more virtual pages as storage areas and managed in that manner.

The virtual page constituting the virtual pool 2711 is provided from one or more different real pools. For example, an uncompressed virtual page 2714 belonging to the uncompressed virtual page storage area 2712 of the virtual pool 2711 is provided from an uncompressed page 2725 belonging to the uncompressed page storage area 2723 of real pool 2722 of the storage subsystem 2721, and a compressed virtual page 2715 belonging to the compressed virtual page storage area 2713 of the virtual pool 2711 is provided from the compressed page 2735 belonging to the compressed page storage area 2734 of the real pool 2732 of the storage subsystem 2731.

Further, the virtual pool 2711 provides a virtual page to the virtual volume as a virtual area. For example, a virtual page 2742 of a virtual volume 2741 is provided from the uncompressed virtual page 2714 of the virtual pool 2711, and a virtual page 2743 of a virtual volume 2741 is provided from compressed virtual pages 2715 and 2716 of the virtual pool 2711.

In the example of FIG. 27, the uncompressed virtual page storage area 2712 of the virtual pool 2711 is composed of an uncompressed page storage area of the real pool, and the compressed virtual page storage area 2713 is composed of a compressed page storage area of the real pool. Further, the virtual storage area of the virtual volume 2741 is composed of pages of the uncompressed virtual page storage area 2712 of the virtual pool 2711 and pages of the compressed virtual page storage area 2713. The relationships thereof are managed via the virtual pool management table 2811.

Figures 28, 29:
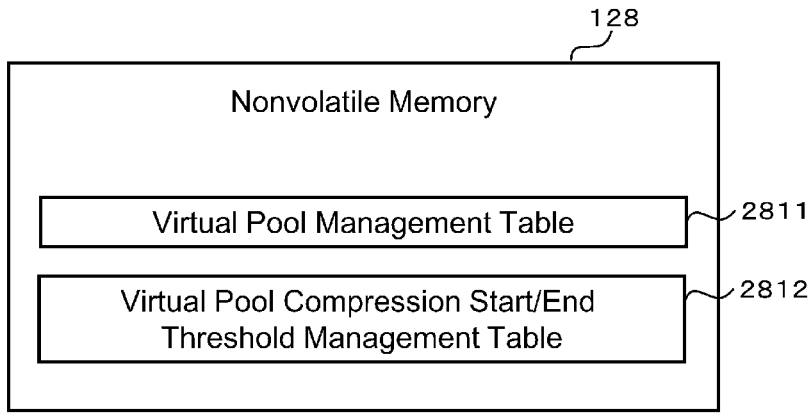
FIG. 28 is an explanatory view showing a table configuration stored to the nonvolatile memory 128 in addition to FIG. 2 according to embodiment 5 of the present invention.
FIG. 29 is an explanatory view showing a configuration of a virtual pool management table 2811 according to embodiment 5 of the present invention.

FIG. 28 is an explanatory view showing the table configuration according to embodiment 5 retained within the nonvolatile memory 128 in addition to the items shown in FIG. 2.

A virtual pool management table 2811 is a table for storing the corresponding relationship between virtual volumes, virtual pools and areas within real pools. The details of this table will be described with reference to FIG. 29. A virtual pool compression start/end threshold management table 2812 is a table for storing the thresholds for starting and ending compression set for each virtual pool. The details of this table will be described with reference to FIG. 30.

FIG. 29 illustrates the virtual pool management table 2811.

A "virtual pool number" column 2910 stores the identification number of virtual pools defined in the storage subsystem 2721 and the storage subsystem 2731.

A "virtual VOL number" column 2911 stores the identification number of virtual volumes defined in the storage subsystem 2721 and the storage subsystem 2731.

A "virtual area ID" column 2912 stores the identification number of virtual areas within the virtual volume.

A "storage ID" column 2913 stores the ID uniquely identifying storages defined in the storage subsystem 2721 and the storage subsystem 2731.

A "real pool number" column 2914 stores the identification number of real pools defined in the storage subsystem 2721 and the storage subsystem 2731.

A "page ID" column 2915 stores the page ID within a real pool allocated to a virtual area ID of the virtual volume.

A "capacity (MB)" column 2916 stores a value of the capacity of the page allocated to the virtual area ID of the virtual volume.

A "compression flag" column 2917 stores a value identifying whether or not compression processing has been executed to the virtual area of the virtual volume. The value "0" shows that data is uncompressed, and "1" shows that data is compressed.

FIG. 30 illustrates a virtual pool compression start/end threshold management table 2812 which is a table for managing the compression start and compression end thresholds when pools astride multiple storages are managed as a single virtual pool in embodiment 5. The virtual pool compression start/end threshold management table 2812 is used instead of the compression start/end threshold management table 222 of FIG. 8 in embodiment 1.

The virtual pool compression start/end threshold management table 2812 manages the correspondence between a "virtual pool number" column 3011, a "storage ID" column 3012, a "real pool number" column 3013, a "compression start threshold" column 3014, and a "compression end threshold" column 3015, for example.

The "virtual pool number" column 3011 stores the identification number of virtual pools defined in the storage subsystem 2721 and the storage subsystem 2731.

The "storage ID" column 3012 stores the ID uniquely identifying storages defined in the storage subsystem 2721 and the storage subsystem 2731.

The "real pool number" column 3013 stores the identification number of real pools defined in the storage subsystem 2721 and the storage subsystem 2731.

The "compression start threshold" column 3014 stores the usage rate of the compression real pool which triggers start of compression.

The "compression end threshold" column 3015 stores the usage rate of the compression real pool which triggers end of compression.

In the present embodiment, the flow accompanying compression based on the capacity thresholds of each real pool is the same as that illustrated in FIGS. 17 and 18.

The respective tables of FIGS. 7, 8, 10 through 15 and FIGS. 29 and 30 can be stored in the storage subsystem having the real pool belonging to the virtual pool, or can be stored in other storage subsystems. If multiple real pools belonging to a virtual pool are included in multiple storage subsystems, it is possible to have the multiple storage subsystems respectively store the shared information, or it is also possible to have information gathered to a single storage subsystem representing the multiple subsystems.

The compression execution determination processing of FIG. 17 can be executed via the storage subsystems storing the respective tables of FIGS. 7, 8, 10 through 15 and FIGS. 29 and 30. The processing can also be executed by other storage subsystems sending an inquiry to the storage subsystems storing the tables of FIGS. 7, 8, 10 through 15 and FIGS. 29 and 30. If multiple real pools belonging to a virtual pool are included in multiple storage subsystems, the process can be executed respectively via each of the multiple storage subsystems, or a single storage subsystem can execute the processes in representation of the multiple subsystems.

The compression start/end thresholds can either be set with respect to each virtual pool, as described in the present invention, or set by additionally adopting a method for setting thresholds for each real pool. When additionally adopting the method for setting thresholds for each real pool, for example, the program can first refer to the threshold of the real pool, wherein if the value has exceeded the threshold of the real pool, the program can refer to the threshold set for the virtual pool belonging to the real pool, and if the value has also exceeded the threshold of the virtual pool, the virtual pool is subjected to compression. Further, the compression can be started when the threshold of either the real pool or the virtual pool is exceeded.

As described, by setting a compression start threshold and a compression stop threshold with respect to virtual pools and performing compression in virtual pool units, it is possible to manage the compression of multiple storage subsystems collectively. Further, in a multi-tenant environment in which a single real pool is divided into multiple virtual pools per user, compression can be managed via user units and the management is facilitated.

Further, even if there is not enough vacant capacity of a portion of the real pools included in the multiple real pools constituting a virtual pool, the capacity of other real pools can be used and compression is not required to be performed if there is sufficient vacant capacity in other real pools included in the multiple real pools constituting the virtual pool, so that the deterioration of performance caused by compression can be prevented.

Thresholds for starting and ending compression processing and decompression processing have been described with reference to embodiments 1 through 5, but the present thresholds can be used for determining the timings for starting and ending processes in a system where data de-duplication processing is performed automatically.

REFERENCE SIGNS LIST

101 Host Computer
102 Management Computer
103 Storage Subsystem
120 Controller
125 CPU
214 Compression Setting Registration Program
215 Compression Program
221 Real Pool Capacity Depletion Threshold Management Table
222 Compression Start/End Threshold Management Table
420 Real pool
430 Virtual Volume
1911 Decompression Program
1912 Decompression Start/End Threshold Management Table
2711 Virtual Pool
2721, 2722 Storage Subsystem
2722, 2732 Real pool
2741 Virtual Volume
2812 Virtual Pool Compression Start/End Threshold Management Table

The invention claimed is:

1. A storage system comprising:
a plurality of first storage devices; and
a first controller;
wherein the first controller:
provides a plurality of virtual volumes each composed of a plurality of virtual storage areas to a host computer coupled thereto;
manages a real pool composed of a plurality of real storage areas;
and when data transmitted from the host computer is received, the first controller:
allocates a real storage area unallocated to the plurality of virtual storage areas out of the plurality of real storage areas as an uncompressed real storage area to a virtual storage area where the data has been transmitted out of the plurality of virtual storage areas;
stores the data in the allocated real storage area;
receives a user input to set a capacity depletion threshold that triggers an expansion of real pool capacity when exceeded and prompts the user when the capacity depletion threshold is exceeded;
determines a data compression start threshold and a data compression end threshold based on the capacity depletion threshold such that the data compression start threshold is 10% less than the capacity depletion threshold and the data compression end threshold is 20% less than the capacity depletion threshold;
if a real pool usage ratio, which is a rate of real storage areas allocated to the plurality of virtual storage areas out of the plurality of real storage areas constituting the real pool, exceeds the data compression start threshold,
the first controller:
executes compression processing of the virtual volumes based on an order of compression target priority set respectively to the plurality of virtual volumes; and
stops execution of the compression processing if the real pool usage rate falls below the data compression end threshold.

2. The storage system according to claim 1, wherein regarding the compression processing of the virtual volumes, the first controller:
specifies a virtual storage area storing uncompressed data out of the plurality of virtual areas of the virtual volume being the target of compression;
executes compression processing of the data stored in an uncompressed real storage area allocated to the specified virtual storage area;
allocates the real storage area unallocated to the plurality of virtual storage areas out of the plurality of real storage areas as an uncompressed real storage area to the specified virtual storage area;
stores the data subjected to compression processing to the compressed real storage area;
cancels allocation of the specified virtual storage area and the uncompressed real storage area allocated to the specified virtual storage area; and
deletes data stored in the uncompressed real storage area having the allocation cancelled.

3. The storage system according to claim 2, wherein the compression target priority is determined based on a compression setting entered via a management computer coupled to the storage system.

4. The storage system according to claim 3, wherein the compression setting is for setting whether or not to permit execution of compression for each of the plurality of virtual volumes;
the compression target priority of a virtual volume in which whether to permit execution of compression is not set out of the plurality of virtual volumes is lower than the compression target priority of the virtual volume in which execution of compression is permitted, and higher than the compression target priority of the virtual volume in which execution of compression is prohibited.

5. The storage system according to claim 4, wherein regarding the plurality of virtual volumes having the same compression setting,
a ratio of the uncompressed real storage areas with respect to the real storage areas allocated to the plurality of virtual volume areas of the virtual volume is referred to, and the virtual volume having a smaller ratio of the uncompressed real storage area is set to have a high compression target priority.

6. The storage system according to claim 2, wherein a plurality of chunks which are storage areas composed of a portion of the real storage areas out of the plurality of real storage areas are managed; wherein
sizes of real storage areas respectively constituting a compressed chunk and an uncompressed chunk included in the plurality of chunks differ;

a size of the real storage area of the compressed chunk is smaller than a size of the real storage area of the uncompressed chunk;

the uncompressed real area is the real storage area included in the uncompressed chunk; and the compressed real area is the real area included in the compressed chunk.

7. The storage system according to claim 2, wherein the first controller includes a CPU; and the compression processing is not executed when any one of the following conditions A through C is satisfied:
   A. a load applied on the CPU is higher than a threshold set in advance;
   B. a specific function set in advance is being executed by the first controller; or
   C. a load applied on the first storage device is higher than a threshold set in advance.

8. The storage system according to claim 2, wherein the sizes of a plurality of real storage areas are the same; and a plurality of real storage areas are allocated to the virtual storage area.

9. The storage system according to claim 2, wherein when the real pool usage rate has exceeded the data compression start threshold, if the ratio of the compressed real storage areas with respect to storage areas already allocated to the plurality of virtual areas out of the plurality of real storage areas exceeds a threshold set in advance, the first controller do not executes the compression processing, and outputs an alert to a management computer coupled thereto.

10. The storage system according to claim 1, wherein if the real pool usage rate falls below a data decompression start threshold set in advance;

the first controller:

executes a decompression processing of the virtual volume based on an order of decompression target priority set respectively for the plurality of virtual volumes; and stops execution of the decompression processing if the real pool usage rate exceeds a data decompression end threshold set in advance.

11. The storage system according to claim 10, wherein regarding the decompression processing of the virtual volumes, the first controller:

specifies a virtual storage area in which compressed data is stored out of the plurality of virtual storage areas of the virtual volume being the target of decompression;

executes decompression processing of data stored in a compressed real storage area allocated to the specified virtual storage area;

allocates a real storage area unallocated to the plurality of virtual storage areas out of the plurality of real storage areas as an uncompressed real storage area to the specified virtual area; and stores data subjected to decompression processing to the allocated uncompressed real storage area, and cancels allocation of the specified virtual storage area and the compressed real storage area allocated to the virtual storage area.

12. The storage system according to claim 11, wherein the first controller includes a CPU; and the decompression processing is not executed when any one of the following conditions A through C is satisfied:
   A. a load applied on the CPU is higher than a threshold set in advance;
   B. a specific function set in advance is being executed by the first controller; or
   C. a load applied on the first storage device is higher than a threshold set in advance.

13. The storage system according to claim 12, wherein the first controller:

manages a plurality of data compression start thresholds;

each of the plurality of data compression start thresholds have a maximum resource usage rate of the CPU regarding compression processing, wherein the value of the maximum resource usage rate of the CPU is set according to the size of the plurality of data compression start thresholds; and the first controller:

executes the compression processing within the range of the maximum resource usage rate of the CPU corresponding to the data compression threshold that the real pool usage rate has exceeded out of the plurality of data compression start thresholds.

14. The storage system according to claim 1, further comprising:

a first storage subsystem having the first controller and the plurality of first storage devices; and a second storage subsystem; wherein the second storage subsystem includes a second controller and a plurality of second storage devices;

the real storage area is composed of a plurality of first real storage areas based on the first storage device, and a plurality of second real storage areas based on the second storage device;

a virtual pool being created astride the first storage subsystem and the second storage subsystem; and the virtual pool is composed of a first real pool created from the first real storage area and a second real pool created from the second real storage area.

15. A storage system comprising:

a plurality of storage devices constituting a basis for a real pool; and a first controller including a CPU; wherein the real pool is composed of a plurality of real storage areas; and the first controller provides a plurality of virtual volumes each composed of a plurality of virtual areas to computers coupled thereto, and when data transmitted from the computer is received, the first controller:

allocates the real storage area unallocated to the plurality of virtual areas out of the plurality of real storage areas as an uncompressed real storage area to a virtual area where the data has been transmitted out of the plurality of virtual areas;

stores the data in the allocated real storage area;

receives a user input to set a capacity depletion threshold that triggers an expansion of real pool capacity when exceeded and prompts the user when the capacity depletion threshold is exceeded;

determines a data compression start threshold and a data compression end threshold based on the capacity depletion threshold such that the data compression start threshold is 10% less than the capacity depletion threshold and the data compression end threshold is 20% less than the capacity depletion threshold;

if a real pool usage rate which is a ratio of real storage areas which are allocated to the plurality of virtual areas out of the plurality of real storage areas constituting the real pool exceeds the data compression start threshold, the first controller executes a compression processing including:

specifying a virtual area storing uncompressed data out of the plurality of virtual areas of the virtual volume being the target of compression based on an order of compression target priority set respectively for the plurality of virtual volumes;

executing data compression processing of the data stored in an uncompressed real storage area allocated to the specified virtual area;

allocating to the specified virtual area a real storage area unallocated to the plurality of virtual areas out of the plurality of real storage areas as a compressed real storage area;

storing to the compressed real storage area the data subjected to compression processing;

cancelling allocation of the specified virtual area and the uncompressed real storage area allocated to the specified virtual area; and deleting data stored in the uncompressed real storage area;

and stops the compression processing when the real pool usage rate falls below the data compression end threshold set in advance;

when the real pool usage rate falls below a data decompression start threshold set in advance;

the first controller executes a decompression processing including:

specifying a virtual area in which compressed data is stored out of the plurality of virtual areas of the virtual volume being the target of decompression based on an order of decompression target priority set respectively for the plurality of virtual volumes;

executing data decompression processing of data stored in a compressed real storage area allocated to the specified virtual area;

allocating a real storage area unallocated to the plurality of virtual areas out of the plurality of real storage areas as uncompressed real storage area to the specified virtual area;

storing data subjected to decompression processing to the allocated uncompressed real storage area;

cancelling allocation of the specified virtual area and the compressed real storage area allocated to the virtual area;

and stops the data decompression processing when the real pool usage rate exceeds a data decompression end threshold set in advance;

wherein the data compression processing or the data decompression processing will not be executed when any one of the following conditions A through C is satisfied, and an alert is output to a management computer coupled thereto:
  A. a load applied on the CPU is higher than a threshold set in advance;
  B. a specific function set in advance is being executed by the first controller; or
  C. a load applied on the first storage device is higher than a threshold set in advance;

wherein even when the real pool usage rate has exceeded the data compression start threshold, if the ratio of the compressed real storage areas with respect to storage areas already allocated to the plurality of virtual areas out of the plurality of real storage areas exceeds a threshold determined in advance, the compression processing is not executed, and an alert is output to a management computer coupled thereto; and the compression target priority of the virtual volume or the virtual area having a low access frequency is set high.

\* \* \* \* \*